(12) United States Patent
Watanabe et al.

(10) Patent No.: US 8,095,819 B2
(45) Date of Patent: Jan. 10, 2012

(54) COMMUNICATION NETWORK FAILURE CAUSE ANALYSIS SYSTEM, FAILURE CAUSE ANALYSIS METHOD, AND FAILURE CAUSE ANALYSIS PROGRAM

(75) Inventors: Yoshinori Watanabe, Tokyo (JP); Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 30 days.

(21) Appl. No.: 12/663,180

(22) PCT Filed: Jun. 6, 2008

(86) PCT No.: PCT/JP2008/060445
§ 371 (c)(1),
(2), (4) Date: Dec. 4, 2009

(87) PCT Pub. No.: WO2008/149975
PCT Pub. Date: Dec. 11, 2008

(65) Prior Publication Data
US 2010/0174945 A1 Jul. 8, 2010

(30) Foreign Application Priority Data
Jun. 6, 2007 (JP) ................................. 2007-150429

(51) Int. Cl.
*G06F 11/00* (2006.01)
(52) U.S. Cl. ......................................................... 714/4.1
(58) Field of Classification Search ................... 714/4.1, 714/25–27, 31–33, 43, 44, 48, 56
See application file for complete search history.

(56) References Cited

U.S. PATENT DOCUMENTS
7,363,543 B2 * 4/2008 Peebles et al. .................. 714/26
7,583,587 B2 * 9/2009 Qiu et al. ...................... 370/216
7,590,513 B2 * 9/2009 Jiang et al. .......................... 703/2
7,676,703 B2 * 3/2010 Uwatoko et al. ................ 714/48

(Continued)

FOREIGN PATENT DOCUMENTS
JP 5-35484 2/1993
(Continued)

OTHER PUBLICATIONS
International Search Report dated Sep. 16, 2008.
(Continued)

*Primary Examiner* — Nadeem Iqbal
(74) *Attorney, Agent, or Firm* — Scully, Scott, Murphy & Presser, P.C.

(57) ABSTRACT

A failure cause analysis system for estimating a cause of a failure in a communication network from recorded contents of internal processing of a communication apparatus includes: feature extraction means for extracting a statistical feature of the recorded contents at a time of occurrence of a failure; and failure cause estimation means for estimating a failure cause based on similarity between a statistical feature of the recorded contents that is acquired at a time of occurrence of a past failure with a known failure cause and the statistical feature of the recorded contents that is acquired at the time of occurrence of the failure. The failure cause analysis system of a communication network provided can acquire the correspondence between failure features and failure causes from past failure cases irrespective of the number of cases as to communication network failures that are detected from process logs retained in communication apparatuses, and quantitatively incorporate the range of dispersion of the features into a judgment to estimate the cause of occurrence of a failure.

12 Claims, 23 Drawing Sheets

U.S. PATENT DOCUMENTS

2008/0010522 A1* 1/2008 Uwatoko et al. .............. 714/23

FOREIGN PATENT DOCUMENTS

| | | |
|---|---|---|
| JP | 11-261471 | 9/1999 |
| JP | 2004-80297 | 3/2004 |
| JP | 2005-269238 | 9/2005 |
| JP | 2005-284519 | 10/2005 |
| JP | 2005-285040 | 10/2005 |
| JP | 2007-20115 | 1/2007 |
| WO | WO 2004/061681 A1 | 7/2004 |

OTHER PUBLICATIONS

Hyvarinen, AAPO et al., with two translators, "Independent component analysis", Tokyo Denki University Press, Feb. 10, 2005, pp. 164-217.

Duda, Richard O. et al., with a supervisor-translator, "Pattern classification", New Technology Communications, Jul. 3, 2001, pp. 32-36, pp. 528-529.

International Search Report dated Sep. 16, 2008.

* cited by examiner

FIG. 9

| IDENTIFICATION NUMBER | CHARACTERISTICS OF FAILURE FEATURE Gr | | | | TOTAL NUMBER OF PAST CASES | NAME OF FAILURE CAUSE | TYPE OF DEFINITION | NUMBER OF OCCURRENCE OF FAILURE CAUSES |
|---|---|---|---|---|---|---|---|---|
| | PROCESS TYPE | PRC-1 | PRC-2 | ... | PRC-N | | | |
| VALUE | AVERAGE OF FREQUENCIES OF APPEARANCE | VALUE | VALUE | ... | VALUE | FREQUENCY | FAILURE CAUSE 1 | PAST CASE/USER REGISTRATION | FREQUENCY |
| | VARIANCE OF FREQUENCIES OF APPEARANCE | VALUE (MATRIX) | | | | | FAILURE CAUSE 2 | PAST CASE/USER REGISTRATION | FREQUENCY |
| | USER EVALUATION | RELEVANT | FREQUENCY | FREQUENCY | ... | FREQUENCY | FAILURE CAUSE 3 | PAST CASE/USER REGISTRATION | FREQUENCY |
| | | IRRELEVANT | FREQUENCY | FREQUENCY | ... | FREQUENCY | FAILURE CAUSE M | PAST CASE/USER REGISTRATION | FREQUENCY |

| USER EVALUATION | | DISPERSION OF FAILURE CAUSES | OTHER FAILURE FEATURE Gr WITH HIGH SIMILARITY | | USER EVALUATION | | TOTAL NUMBER OF EVALUATIONS |
|---|---|---|---|---|---|---|---|
| RELEVANT | IRRELEVANT | | IDENTIFICATION NUMBER | SIMILARITY | RELEVANT | IRRELEVANT | |
| FREQUENCY | FREQUENCY | VALUE | VALUE | VALUE | FREQUENCY | FREQUENCY | FREQUENCY |
| FREQUENCY | FREQUENCY | | VALUE | VALUE | FREQUENCY | FREQUENCY | |
| ... | ... | | ... | ... | ... | ... | |
| FREQUENCY | FREQUENCY | | VALUE | VALUE | FREQUENCY | FREQUENCY | |

FAILURE FEATURE DB 504

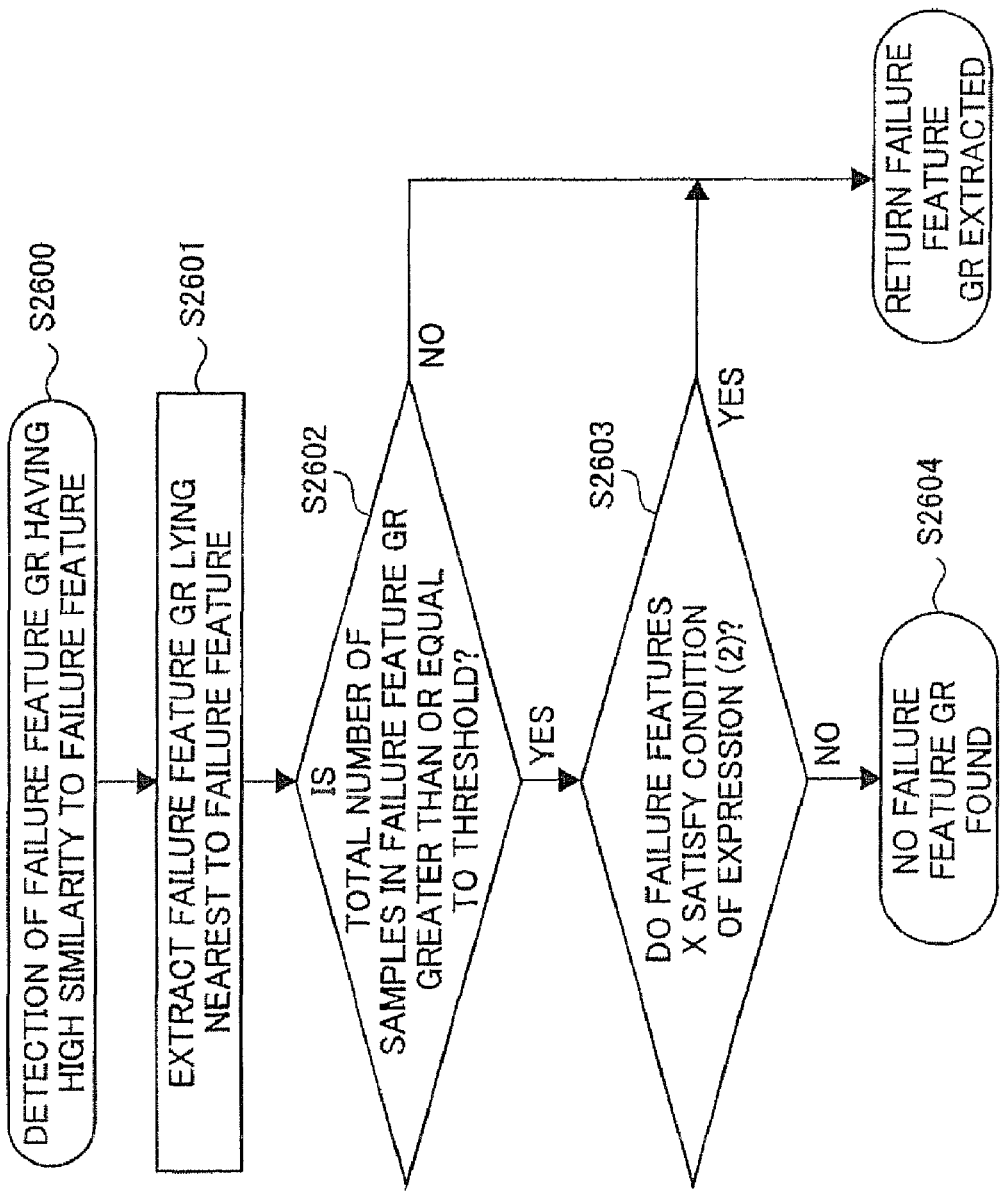

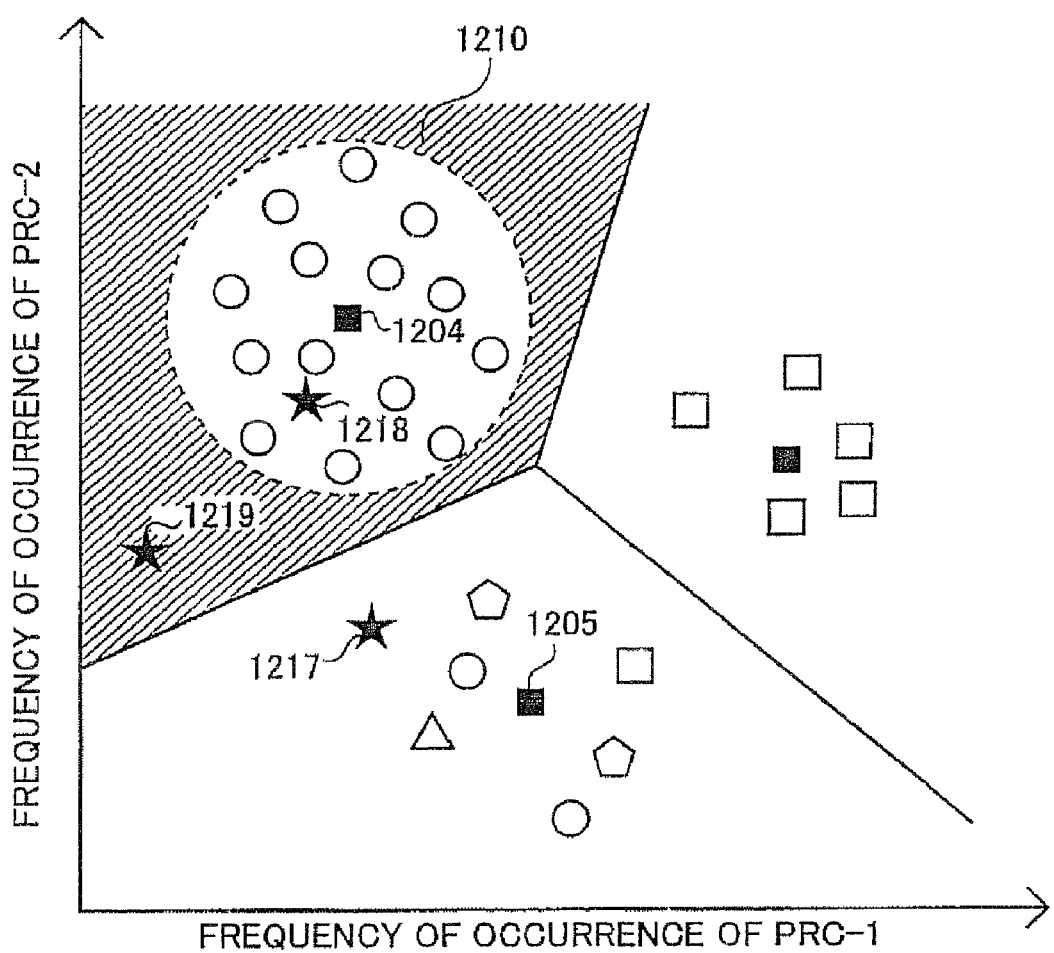

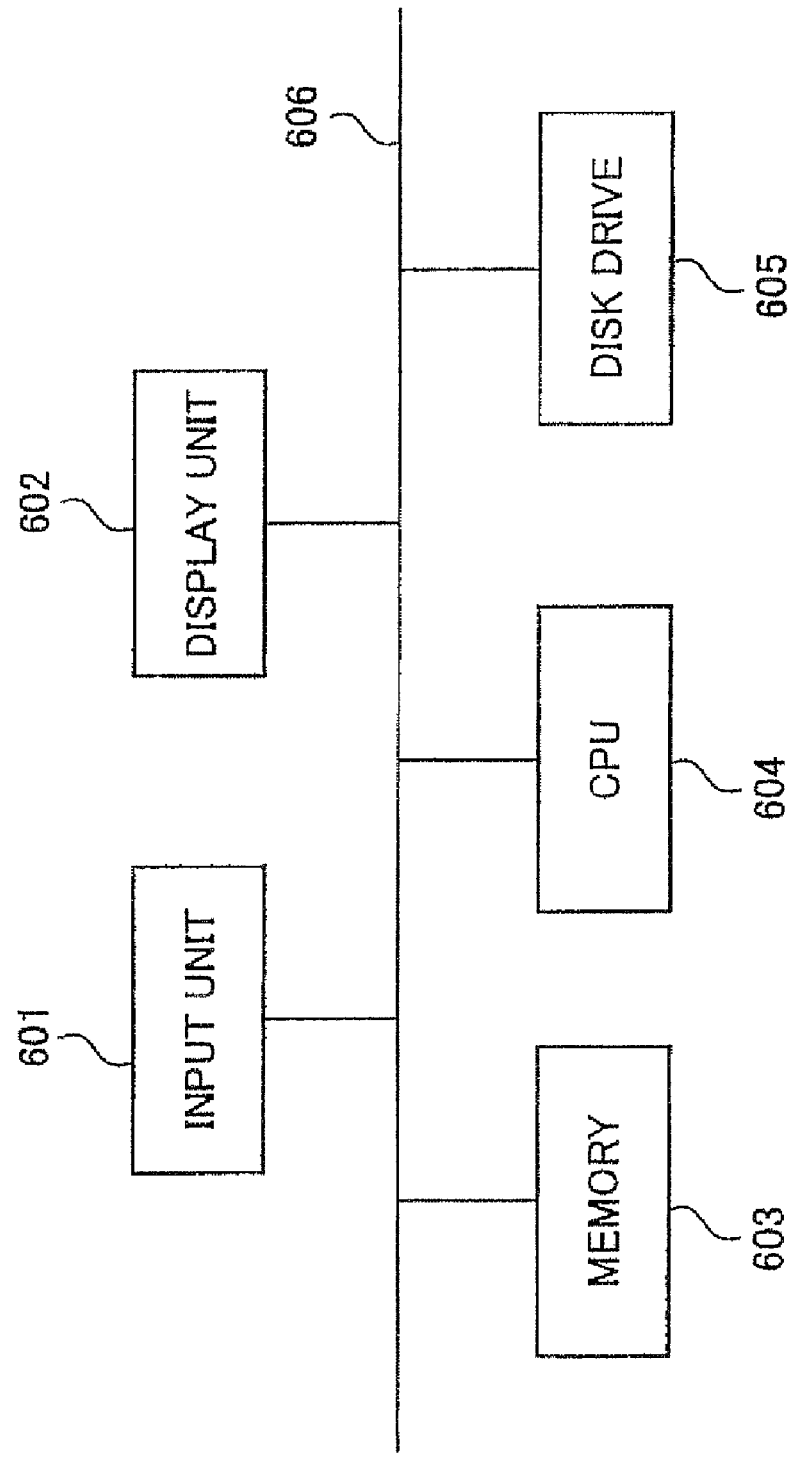

COMMUNICATION NETWORK FAILURE CAUSE ANALYSIS SYSTEM, FAILURE CAUSE ANALYSIS METHOD, AND FAILURE CAUSE ANALYSIS PROGRAM

TECHNICAL FIELD

The present invention relates to a failure cause analysis system of a communication network, a failure cause analysis method, and a failure cause analyzing program. In particular, the present invention relates to a failure cause analysis system of a communication network, a failure cause analysis method, and a failure cause analyzing program which analyze process logs retained in communication apparatuses that constitute the communication network, and estimate the cause of a communication network failure from statistical features of the process logs. This application is based upon and claims the benefit of priority from prior Japanese Patent Application No. 2007-150429, filed Jun. 6, 2007. The contents of Japanese Patent Application No. 2007-150429 are incorporated in the contents of description of this application.

BACKGROUND ART

There has been known a system in which a plurality of communication apparatuses are connected to constitute a communication network.

FIG. 1 shows a block diagram of the system in which a plurality of communication apparatuses are connected to constitute a communication network.

The communication network of FIG. 1 includes: an upper communication apparatus 200; communication apparatuses 201 to 203 which are connected to the communication apparatus 200; communication terminals 204 and 205 which are connected to the communication apparatuses 201 to 203; and a network management system 206 which is connected to the communication apparatus 200.

The upper communication apparatus 200 relays data to/from an external network.

The communication apparatuses 201 to 203 are each connected to any one of the communication terminals 204 and 205, and are controlled in operation by the communication apparatus 200. FIG. 1 shows the case where the communication apparatuses 201 and 203 are connected to the communication terminals 204 and 205, respectively.

The communication terminals 204 and 205 are each connected to any one of the communication apparatuses 201 to 203 through a communication medium.

The network management system 206 is connected to the communication apparatus 200, and manages the operation status of the communication network.

Take a mobile communication system as a concrete example. A base station control apparatus corresponds to the communication apparatus 200. Wireless base stations correspond to the communication apparatuses 201 to 203. Mobile stations correspond to the communication terminals 204 and 205.

If a fault occurs between mutually-opposed communication apparatuses in the network of FIG. 1, such as between the communication apparatuses 200 and 201, a message for notifying of the fault is transmitted from the communication apparatus 200 or 201 to the network management system 206.

The network management system 206 is monitored by a maintenance person. When the network management system 206 receives the fault notification message, the maintenance person analyzes the message and takes specific measures for recovery based on the result of analysis.

Patent Document 1 describes an example of a system that analyzes such a fault notification message to estimate the cause of a failure occurring in a communication network.

The failure cause estimation system described in Patent Document 1 analyzes the pattern of occurrence of the fault notification message, estimates the failure cause according to predetermined estimation rules, and automatically takes countermeasures.

With the recent sophistication of communication apparatuses, however, it has become difficult to provide in advance an exhaustive set of such fault notification messages for all faults that can occur in a communication network.

There has thus been the problem that if there occurs a fault that is not previously expected to be notified of or if there occurs a fault in the fault-notifying function itself, the fault fails to be detected and the failure of the communication network tends to last long.

In such cases where a fault notification message is not appropriately output despite the presence of a serious communication failure such as quality degradation in the communication network, a method is used to analyze process logs retained in the communication apparatuses to detect the communication failure and identify the failure cause.

Since the process logs contain more detailed information on the internal processing of the apparatuses than fault notification messages do, it is sometimes possible to detect a communication failure that is not detectable by means of the fault notification messages and estimate the cause of the communication failure.

An example of the process logs retained in the communication apparatuses is described in Patent Document 2.

The process log described in Patent Document 2 is generally referred to as call processing alert log, which contain information such as the location of processing where an abnormal disconnection occurs in the middle of call processing inside a communication apparatus and the reason of occurrence of the abnormal disconnection.

Examples of the reason of occurrence of an abnormal disconnection include a timeout in standby processing, the occurrence of congestion, the occurrence of call admission control, an insufficient communication band, and loss of a terminal.

Generally, the call processing alert log is accumulated in a recording apparatus provided in the communication apparatus 200 or the network management system 206 as a time-series log that is accompanied with such information as the date and time of occurrence and communication nodes involved in an abnormal disconnection.

Such process logs in the communication apparatuses may be output to an external network management system beforehand in preparation for the occurrence of a failure, whereas the process logs are usually not output to exterior but acquired upon the occurrence of a failure if necessary.

Patent Document 3 describes an example of a system that detects a failure in a communication network by analyzing logs that record abnormal processes, like a call processing alert log, among such process logs retained in communication apparatuses.

FIG. 2 is a block diagram showing the configuration of a failure detection system of a communication network that is described in Patent Document 3.

The failure detection system 207 shown in FIG. 2 is described for the case where the failure detection system 207 is connected to the network management system 206, for example. The failure detection system shown in FIG. 2 includes a log collecting unit 100, an observation amount extracting unit 101, a failure feature extracting unit 102, a failure feature appearance intensity calculating unit 103, an appearance intensity probability distribution calculating unit 104, a network characteristic DB (database) 105, an abnormality calculating unit 106, a failure detecting unit 107, a result display unit 108, and an input unit 109.

The log collecting unit 100 collects process logs that are accumulated in the network management system 206.

The observation amount extracting unit 101 extracts observation amount necessary for monitoring the network status from the collected logs.

The failure feature extracting unit 102 extracts failure features from the observation amount that is extracted by the observation amount extracting unit 101.

The failure feature appearance intensity calculating unit 103 calculates the appearance intensities of the failure features from the observation amount of the observation amount extracting unit 101.

The appearance intensity probability distribution calculating unit 104 calculates a probability distribution at normal time from the failure feature appearance intensity calculating unit 103.

The network characteristic DB 105 stores the probability distribution at normal time calculated by the appearance intensity probability distribution calculating unit 104 and the failure features calculated by the failure feature extracting unit 102.

The abnormality calculating unit 106 compares the magnitudes of the appearance intensities calculated by the failure feature appearance intensity calculating unit 103 and the probability distribution of the appearance intensities of the failure features at normal time stored in the network characteristic DB 105 to calculate the degrees (abnormalities) how the appearance intensities are abnormal.

The abnormality calculating unit 106 also integrates the abnormalities of a plurality of failure features to calculate the abnormality of a communication node.

The failure detecting unit 107 compares the abnormality of the communication node and an abnormality threshold stored in the network characteristic DB 105, thereby judging the state of the communication node to detect a failure.

The result display unit 108 displays the result of failure detection on a display device such as a CRT (Cathode Ray Tube).

The observation amount that the observation amount extracting unit 101 extracts the logs from the log collecting unit 100 are multidimensional vectors. The observation amount extracting unit 101 extracts processes pertaining to a certain communication node from the logs, and determines the numbers of occurrence of respective types of processes extracted per unit time as respective vector elements.

The failure features that the failure feature extracting unit 102 extracts from the observation amount are multidimensional vectors. The multidimensional vectors are statistically or empirically extracted from the observation amount, and include variation components that are statistically uncorrelated, variation components that are statistically independent, and variation components that are statistically neither fully uncorrelated nor independent but are empirically known to be related to failure causes.

Examples of the failure causes include the appearance of an interference signal, a temporary sharp increase in the number of communication users, the interruption of a communication channel, and a breakdown of a communication apparatus.

FIG. 3 is a configuration diagram showing the configuration of information that is stored in the network characteristic DB 105.

The network characteristic DB 105 contains parameters that indicate the characteristics of each of communication nodes 1 to J (J is a natural number) to be monitored.

The characteristic parameters of a communication node include: failure features 1 to N (N is a natural number) extracted from the logs (statistical features of the logs upon the occurrence of a failure); the probability distributions of the appearance intensities of the statistics at normal time; and an abnormal threshold intended for failure detection.

Next, the operation of the failure detection system of a communication network described in Patent Document 3 will be described in detail with reference to FIGS. 4 and 5.

FIG. 4 is a flowchart for explaining the operation of the failure detection system of a communication network that is described in Patent Document 3.

In FIG. 4, the operation is started at step 300. The observation amount extracting unit 101 then extracts the numbers of occurrence of processes occurring in the communication nodes to be monitored per unit time from the logs collected by the log collecting unit 100. Multidimensional vectors that contain those values as elements are assumed to be observation amount (step S301).

Here, the communication nodes to be monitored for a failure and the time range are specified by a user through the input unit 109.

Now, if the network characteristic DB 105 is not constructed yet, a determination to update the network characteristic DB 105 is made at step S302, so that the network characteristic DB 105 is constructed at step S303 prior to the monitoring of the communication network for a failure.

FIG. 5 is a flowchart for explaining the operation of the processing for constructing the network characteristic DB 105 at step S303.

Initially, the construction (update) of the network characteristic DB is disclosed at step S400. At step S401, a set of samples is created to include both normal samples and failure samples, with observation amount obtained from the communication nodes to be monitored (communication nodes 1 to J) in each unit time as the samples.

Next, at step S402, statistical features of failures are extracted from the set of samples and stored in the network characteristic DB 105.

Then, at step S403, samples of observation amount that are obtained when the communication nodes 1 to J to be monitored are in a normal state are extracted from the set of samples.

At step S404, the appearance intensities of the failure features are calculated from the respective samples extracted at step S403.

Then, at step S405, the probability distributions of the appearance intensities are calculated from the set of appearance intensities of the failure features created at step S403, and stored in the network characteristic DB 105.

At step S406, samples of observation amount that are obtained when the communication nodes 1 to J to be monitored are in a failure state are extracted from the set of samples.

At step S407, the appearance intensities of the failure features are calculated from the respective samples extracted at step S406.

Then, at step S408, the abnormalities of the appearance intensities of the failure features are integrated to determine the abnormalities of the communication nodes 1 to J.

At step S409, an abnormality threshold which is determined based on the distribution of the abnormalities of the communication nodes 1 to J at failure time or based on operation policy is stored in the network characteristic DB 105.

In this way, the network characteristic DB 105 can be updated by the processing of constructing a network characteristic DB according to the flowchart shown in FIG. 5.

Returning to step S303 of FIG. 4, the failure detection system of a communication network described in Patent Document 3 detects a failure of a communication node by using the network characteristic DB 105 constructed as described above.

Specifically, at step S304, the appearance intensities of the failure features stored in the network characteristic DB 105 are calculated from the observation amount.

At step S305, the abnormalities of the communication nodes are determined from the probability distributions stored in the network characteristic DB 105.

At step S306, the abnormalities of the communication nodes to be monitored and the threshold stored in the network characteristic DB 105 are compared to judge the presence or absence of a failure.

In the foregoing operation, the abnormalities of the appearance intensities of the failure features are set in terms of any of upper probabilities, lower probabilities, and two-sided probabilities of the appearance intensities that are determined from the probability distributions stored in the network characteristic DB 105. The abnormalities of the communication nodes are determined as the products of the abnormalities of the appearance intensities that are determined of the respective failure features.

The failure detection system of a communication network described in Patent Document 3 thereby achieves the detection of failures in the communication network, using the process logs retained in the apparatuses.

Patent Document 1: JP-A-2004-80297
Patent Document 2: JP-A-11-261471
Patent Document 3: JP-A-2007-020115
Non-Patent Document 1: Aapo Hyvarinen et al., with two translators, "Independent component analysis", Tokyo Denki University Press, Feb. 10, 2005, pp. 164-217
Non-Patent Document 2: Richard O. Duda et. al, with a supervisor-translator, "Pattern classification", New Technology Communications, Jul. 3, 2001, pp. 32-36, pp. 528-529

DISCLOSURE OF THE INVENTION

Problems to be Solved by the Invention

Process logs often contain nothing more than a history of the internal processing of communications.

Thus, it is usually not easy for maintenance persons who check the contents of the history to detect failures and estimate the causes of occurrence.

In the related technology, the output characteristics of the logs are then statistically analyzed to extract failure features, and the features are used to automatically detect failures. This has not gone far enough, however, to estimate the causes of occurrence of the failures detected.

More specifically, in order to estimate the causes of occurrence of failures detected from the logs, the failure features extracted from the logs and the failure causes need to be associated with each other. It is often difficult to acquire such correspondence relation, however, for the following reasons.

A first reason is that the failure features extracted from the logs are statistical quantities and have dispersions in value, which make the correspondence relation between the failure features and failure causes unclear.

Such dispersions of the failure features often result from processes that regularly occur in the communication nodes independently of failures, and from the incompletely-separated remainder of other failure features.

Even if the correspondence relation is acquired from past failure cases, the ranges of dispersion in value are difficult to identify due to a small accumulation of cases as to failures that occur immediately after the start of operation of a new system and failures that occur less frequently.

Consequently, it is often difficult to acquire the correspondence relation between failure features and failure causes.

A second reason is that even when an attempt is made to acquire the correspondence relation between failure features and failure causes from past failure cases, there may not be found any failure cause corresponding to a newly-extracted failure feature in the past failure cases solved.

In such a case, the behavior of the apparatuses in operation needs to be logically estimated to establish the association between the failure features and failure causes with the design information on the apparatuses as a clue.

Since the internal processing of the communication apparatuses has been getting sophisticated recently, it has become difficult to acquire prior knowledge for associating the processes in the apparatuses with failure causes. There have thus been many difficulties in associating failure features with failure causes.

A first exemplary object of the present invention has been achieved in view of the foregoing problems, and is to provide a failure cause analysis system of a communication network, a failure cause analysis method, and a failure cause analyzing program which can acquire the correspondence relation between failure features and failure causes from past failure cases irrespective of the number of cases as to communication network failures that are detected from process logs retained in communication apparatuses, and quantitatively incorporate the ranges of dispersion of the features into a judgment to estimate the cause of occurrence of a failure.

A second exemplary object of the present invention has been achieved in view of the foregoing problems, and is to provide a failure cause analysis system of a communication network, a failure cause analysis method, and a failure cause analyzing program which can support a user to create analysis rules quickly and can use the rules created from information acquired from the user to estimate the cause of a failure even if it is not possible to acquire the correspondence relation between failure features and failure causes from past failure cases as to communication network failures that are detected from process logs retained in communication apparatuses.

Means for Solving the Problems

A first exemplary failure cause analysis system according to the present invention is a failure cause analysis system for estimating a cause of a failure in a communication network from recorded contents of internal processing of a communication apparatus, the system including:

a feature extracting unit that extracts a first statistical feature of the recorded contents at a time of occurrence of a failure from the recorded contents input;

a storing unit that stores a second statistical feature of the recorded contents at a time of occurrence of a past failure with a known failure cause; and a failure cause estimating unit that estimates a failure cause based on similarity between the first statistical feature and the second statistical feature.

A second exemplary failure cause analysis system according to the present invention is a failure cause analysis system for estimating a cause of a failure in a communication network from recorded contents of internal processing of a communication apparatus, the system including:

a feature extracting unit that extracts a statistical feature of the recorded contents at a time of occurrence of a failure from the recorded contents input;

an output unit that outputs first information including the statistical feature;

an input unit to which second information is input, the second information including at least one of correspondence relation between a failure cause and the statistical feature and a point of interest of the statistical feature; and a failure cause estimating unit that estimates a failure cause based on the second information input.

A first exemplary failure cause analysis method according to the present invention is a failure cause analysis method for a failure cause analysis system that estimates a cause of a failure in a communication network from recorded contents of internal processing of a communication apparatus, the method including:

a feature extraction step of extracting a first statistical feature of the recorded contents at a time of occurrence of a failure from the recorded contents input; and a failure cause estimation step of estimating a failure cause based on similarity between a second statistical feature of the recorded contents at a time of occurrence of a past failure with a known failure cause and the first statistical feature.

A second exemplary failure cause analysis method according to the present invention is a failure cause analysis method for a failure cause analysis system that estimates a cause of a failure in a communication network from recorded contents of internal processing of a communication apparatus, the method including:

a feature extraction step of extracting a statistical feature of the recorded contents at a time of occurrence of a failure from the recorded contents input;

an output step of outputting first information including the statistical feature;

an input step in which second information is input, the second information including at least one of correspondence relation between a failure cause and the statistical feature and a point of interest of the statistical feature; and a failure cause estimation step of estimating a failure cause based on the second information input.

A first exemplary failure cause analyzing program according to the present invention is a failure cause analyzing program for estimating a cause of a failure in a communication network from recorded contents of internal processing of a communication apparatus, the program causing a computer to execute:

feature extraction processing of extracting a first statistical feature of the recorded contents at a time of occurrence of a failure from the recorded contents input; and failure cause estimation processing of estimating a failure cause based on similarity between a second statistical feature of the recorded contents at a time of occurrence of a past failure with a known failure cause and the first statistical feature.

The second exemplary failure cause analysis method according to the present invention is a failure cause analyzing program for estimating a cause of a failure in a communication network from recorded contents of internal processing of a communication apparatus, the program causing a computer to execute:

feature extraction processing of extracting a statistical feature of the recorded contents at a time of occurrence of a failure from the recorded contents input;

output processing of outputting first information including the statistical feature;

input processing in which second information is input, the second information including at least one of correspondence relation between a failure cause and the statistical feature and a point of interest of the statistical feature; and failure cause estimation processing of estimating a failure cause based on the second information input.

Advantages of the Invention

According to the present invention, the failure cause analysis system of a communication network divides dispersive failure features into groups based on similarity, acquires correspondence relation between the failure features and failure causes from past failure cases, and estimates the cause of occurrence of a new failure based on the correspondence relation. Here, depending on the number of past cases, the failure cause analysis system quantitatively incorporates the ranges of dispersion of the failure features into the criteria of judgment when estimating the failure cause.

Consequently, the failure cause analysis system of a communication network can acquire the correspondence relation between the failure features and failure cases from the past failure cases and estimate the cause of occurrence of a failure even if the failure features of the communication network failures detected from process logs retained in communication apparatuses have dispersions or if there are not many similar cases in the past.

According to the present invention, the failure cause analysis system of a communication network presents the failure features extracted from the logs to a user, and collects user's evaluation information that is given to the presented failure features based on the past experience of failure solving. The failure cause analysis system acquires the correspondence relation between the failure features and failure causes from the evaluation information collected, and estimates the failure cause.

Consequently, the failure cause analysis system of a communication network can support the user to create rules quickly and estimate the cause of occurrence of a failure even if it is not possible to acquire the correspondence relation between failure features and failure causes from past failure cases as to communication network failures that are detected from process logs retained in communication apparatuses.

BRIEF DESCRIPTION OF THE DRAWINGS

FIG. 9 is a configuration diagram showing the configuration of information that is stored in a failure feature DB 504 according to Embodiment 1 of the present invention.

FIG. 21 is a flowchart for explaining the operation of processing for detecting a failure feature Gr having high similarity to a failure feature according to Embodiment 1 of the present invention.

FIG. 22 is a diagram for explaining an example of the processing for detecting a failure feature Gr having high similarity to a failure feature according to Embodiment 1 of the present invention.

FIG. 23 is a block diagram showing a configuration of a computer.

EXPLANATION OF REFERENCE SYMBOLS

Figure 1:
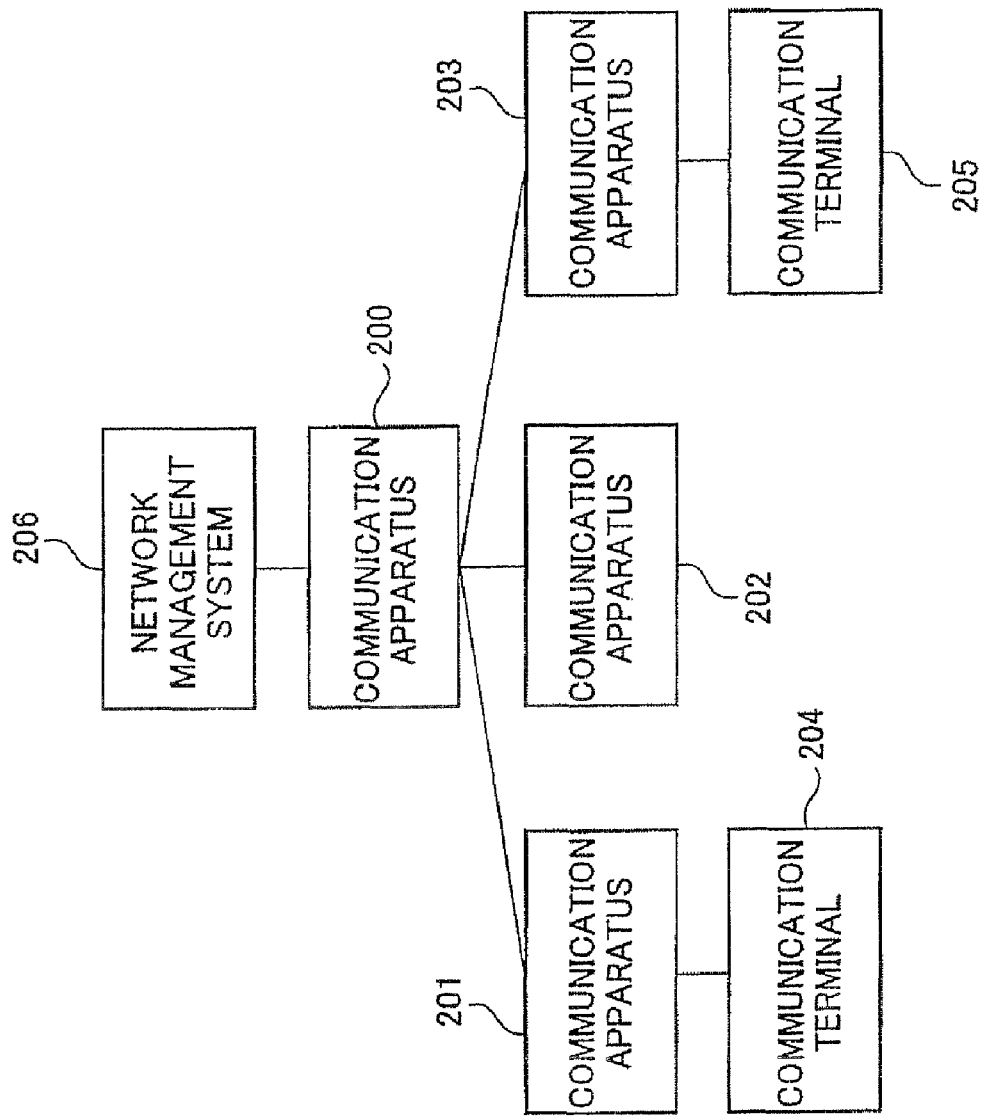
FIG. 1 is a diagram showing an example of the device configuration of a communication network according to a related technology.

100: log collecting unit
101: observation amount extracting unit
102: failure feature extracting unit
103: failure feature appearance intensity calculating unit
104: appearance intensity probability distribution calculating unit
105: network characteristic DB
106: abnormality calculating unit
107: failure detecting unit
108: result display unit
200 to 203: communication apparatus
204, 205: communication terminal
206: network management system
207: failure detection system
208: failure cause analysis system
209: failure detecting section
210: cause analysis section
211: knowledge forming section
501: failure case DB
502: failure feature grouping unit
503: failure feature DB constructing unit
504: failure feature DB
505: failure cause list generating unit
506: analysis result summarizing unit
507: failure cause comprehensive judgment unit
508: user evaluation information summarizing unit
109, 509, 510: input unit
1002 to 1009, 1102 to 1105, 1111 to 1116, 1117 to 1122: column in a table of result of analysis
1010, 1106, 1123 to 1124: button
1011, 1125: result of analysis
1001, 1101: graph
1201 to 1203: region in failure feature Gr
1204 to 1206, 1213: representative point of failure feature Gr
1207 to 1212, 1214 to 1216: boundary surface of failure feature Gr
1217 to 1219: failure feature

BEST MODE FOR CARRYING OUT THE INVENTION

Next, an exemplary embodiment for carrying out the present invention will be described in detail with reference to the drawings.

(1) Configuration of Failure Cause Analysis System

Figure 6:
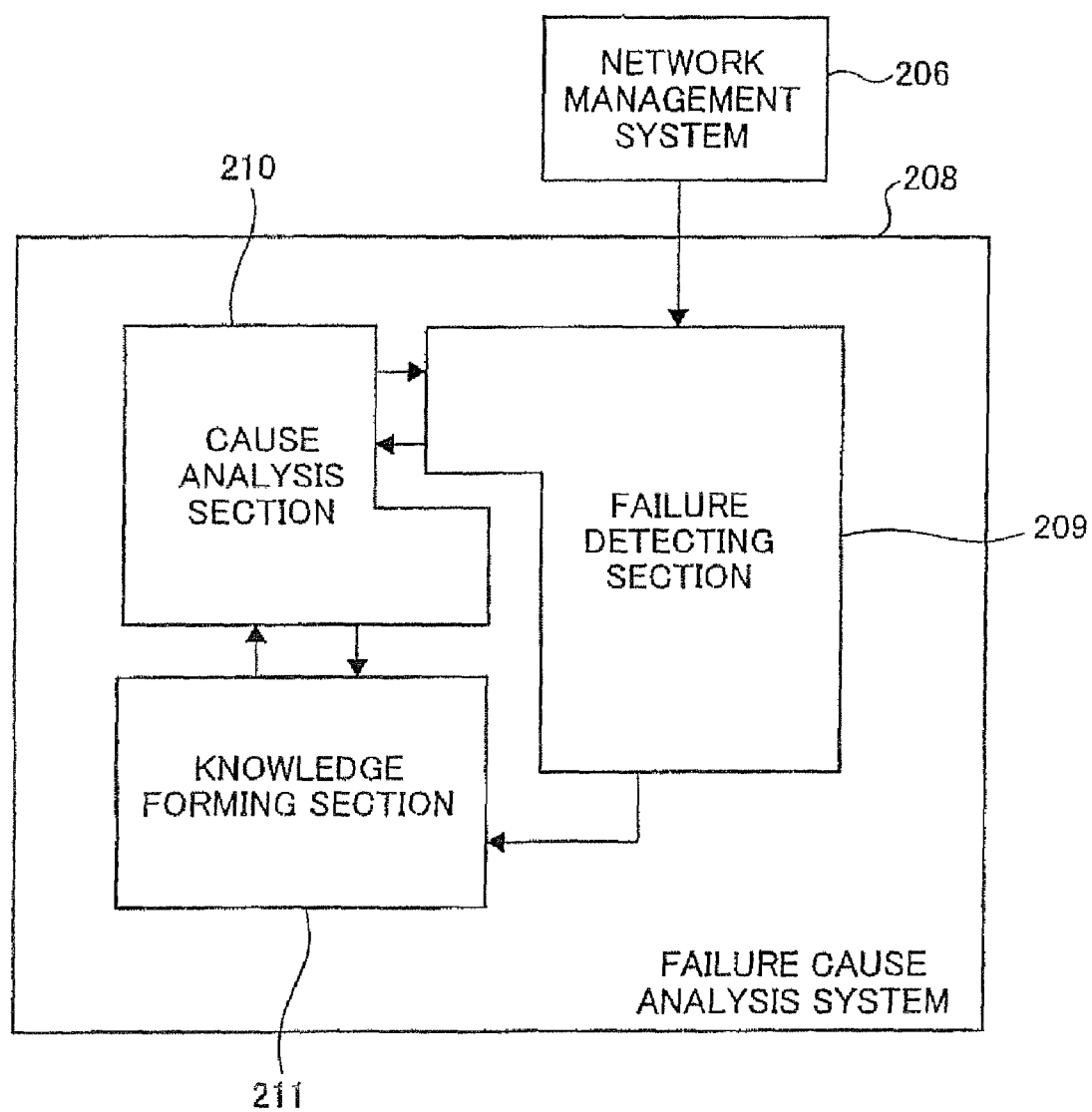
FIG. 6 is a block diagram showing the configuration of a failure cause analysis system of a communication network according to Embodiment 1 of the present invention.
Figure 7:
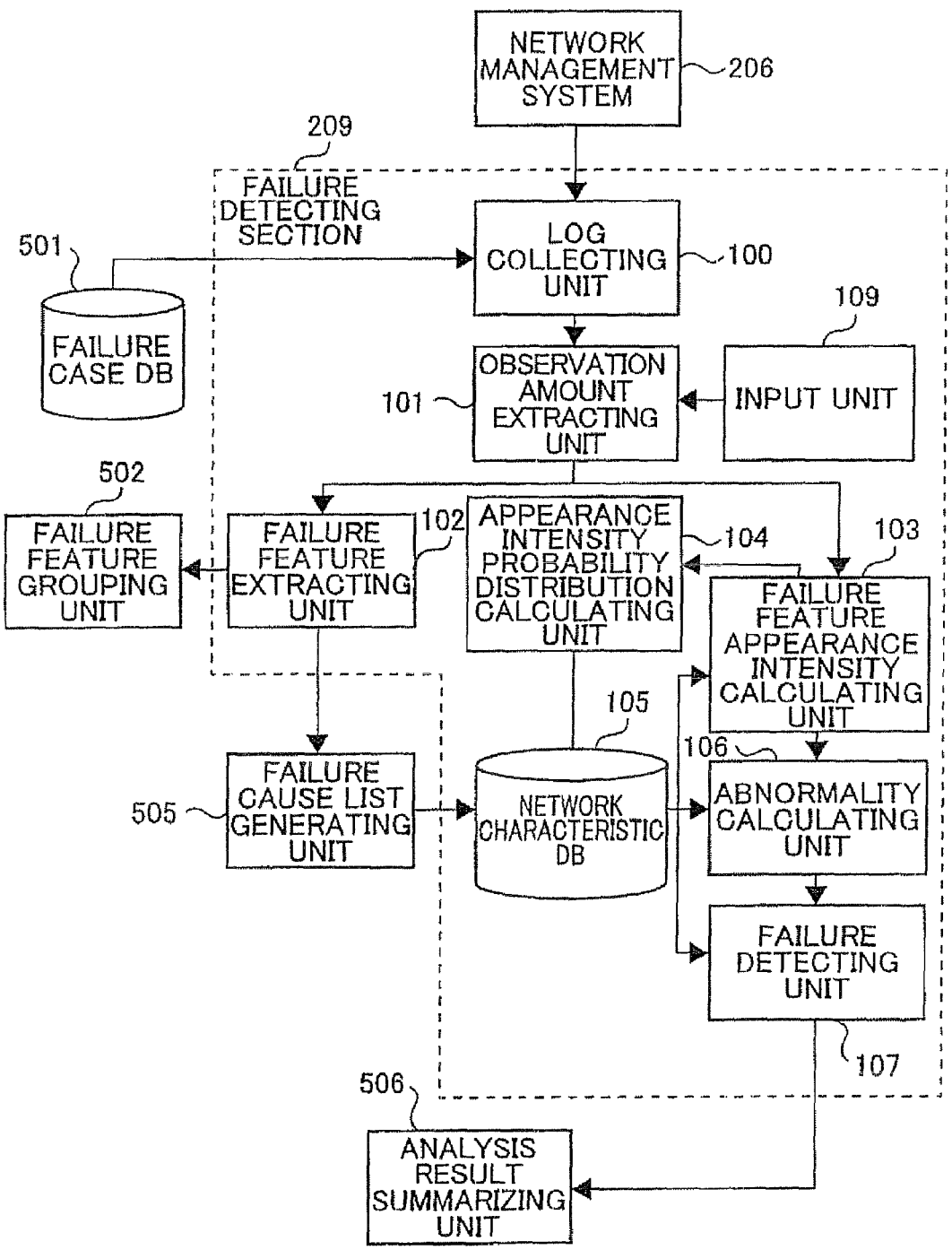
FIG. 7 is a block diagram showing the configuration of a failure detecting section according to Embodiment 1 of the present invention.
Figure 8:
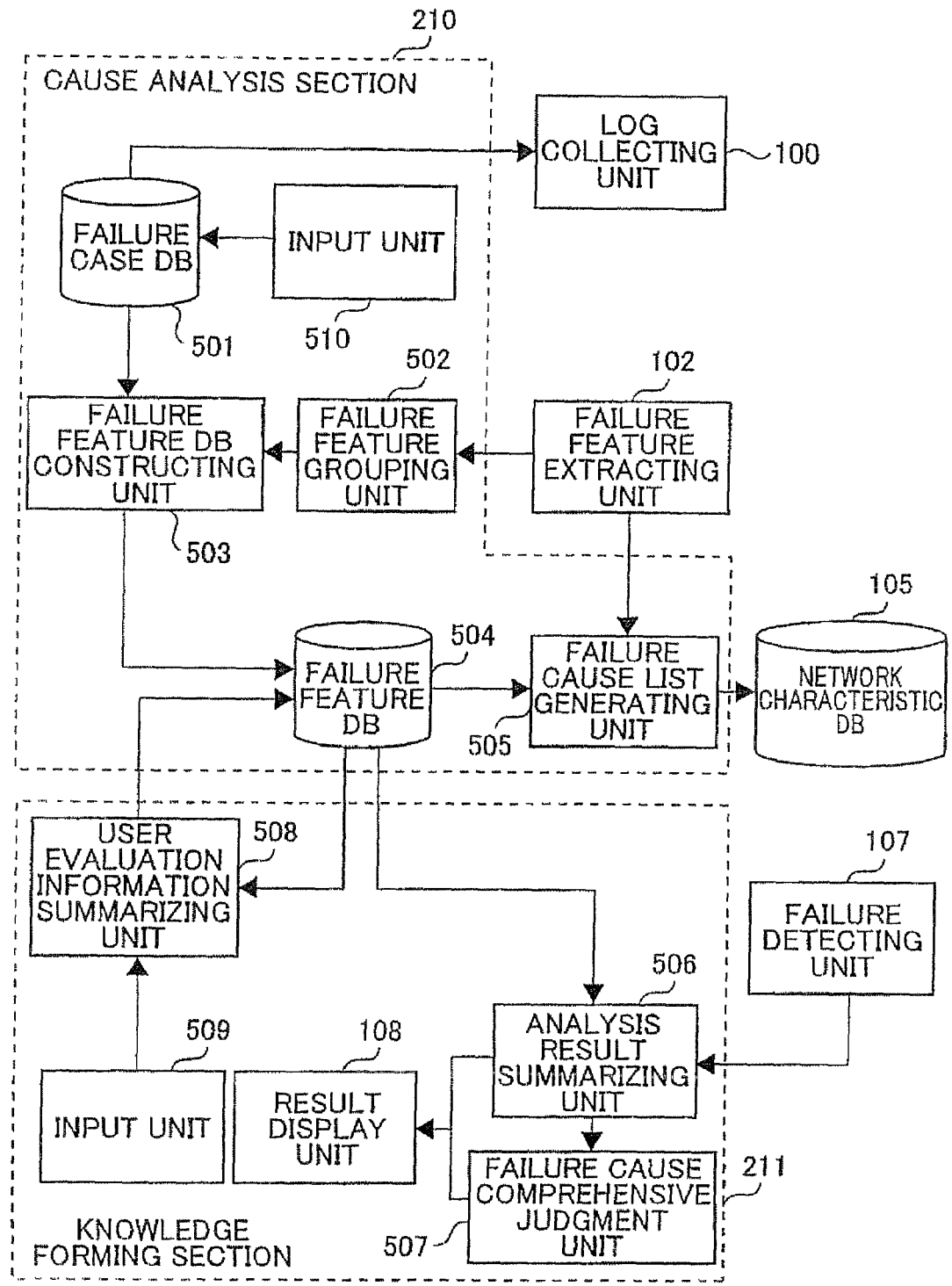
FIG. 8 is a block diagram showing the configuration of a cause analysis section and a knowledge forming section according to Embodiment 1 of the present invention.

FIG. 6 is a block diagram showing the configuration of a failure cause analysis system of a communication network, which is Embodiment 1 for carrying out the present invention. FIG. 7 is a block diagram showing the configuration of a failure detecting section. FIG. 8 is a block diagram showing the configuration of a cause analysis section and a knowledge forming section. The failure case DB 501, failure feature grouping unit 502, and failure cause list generating unit 505 which are arranged outside the failure detecting section 209 in FIG. 7 are included in the cause analysis section 210 as shown in FIG. 8. The analysis result summarizing unit in FIG. 7 is included in the knowledge forming section 211 as shown in FIG. 8. The log collecting unit 100, failure feature extracting unit 102, network characteristic DB 105, and failure detecting unit 107 in FIG. 8 are included in the failure detecting section 209 as shown in FIG. 7.

The failure cause analysis system 208 shown in FIG. 6 includes the failure detecting section 209, the cause analysis section 201, and the knowledge forming section 211.

Figure 2:
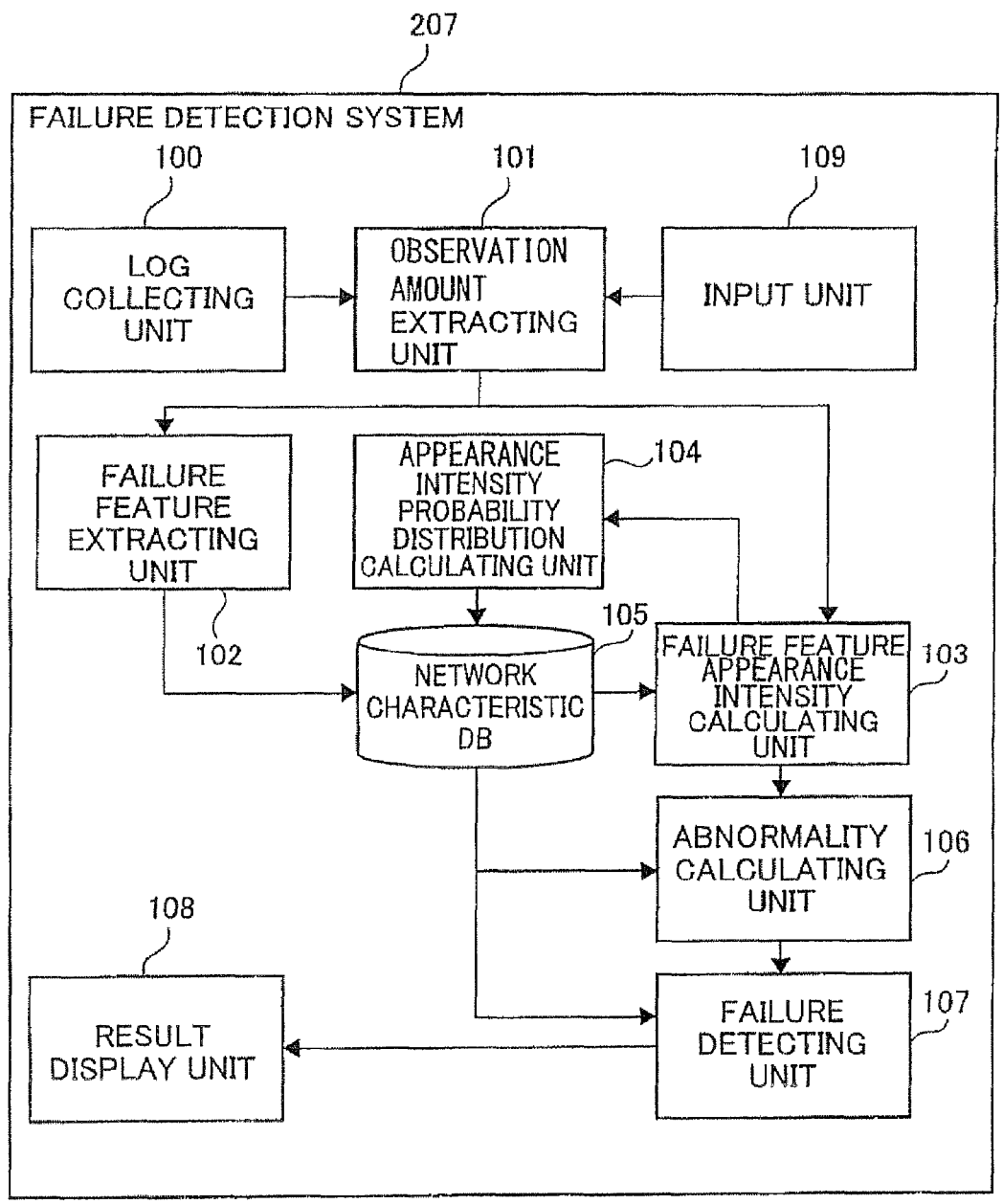
FIG. 2 is a block diagram of the failure detection system of a communication network according to Patent Document 3, a related technology.

The failure detecting section 209 in the failure cause analysis system 208 of the present embodiment is the same as the failure detection system 207 shown in FIG. 2. Note that the failure detecting section 209 of the present embodiment does not include the result display unit 108. The result display unit 108 is included in the knowledge forming section 211.

Consequently, the failure cause analysis system according to the present embodiment differs from the failure detection system 207 of FIG. 2 in having the cause analysis section 210 and the knowledge forming section 211. The following description will deal primarily with the difference. Description of the same elements as in the configuration of FIG. 2 will be omitted as appropriate.

The failure cause analysis system 208 of the present embodiment, as mentioned above, includes the cause analysis section 210 and the knowledge forming section 211 in addition to the failure detecting section 209.

The cause analysis section 210 initially acquires correspondence relation between failure features and failure causes from past failure cases, and uses the correspondence relation to generate a list of failure causes that occur on communication nodes to be analyzed.

The cause analysis section 201 includes the failure case DB 501, the failure feature grouping unit 502, a failure feature DB constructing unit 503, a failure feature DB 504, a failure cause list generating unit 505, and an input unit 510.

The failure case DB 501 contains process logs and information on failure causes which are acquired from apparatuses before and after the occurrence of failures in past failure cases.

The failure feature grouping unit 502 supplies the process logs stored in the failure case DB 501 to the log collecting unit 100. The failure feature grouping unit 502 groups multidimensional vectors (failure features), which are extracted from the logs by the failure feature extracting unit 102, depending on similarity between the vectors.

Based on groups of failure features (failure feature Grs) that are formed by the failure feature grouping unit 502 and failure causes that are stored in the failure case DB 501, the failure feature DB constructing unit 503 estimates correspondence relation between the failure feature Grs and the failure causes.

The failure feature DB constructing unit 503 then stores the information (i.e., the information on the correspondence relation) into the failure feature DB 504.

The failure cause list generating unit 505 evaluates the similarity between failure features that are extracted by the failure feature extracting unit 102 from the logs of communication nodes to be analyzed (the statistical features of the logs at the time of occurrence of a failure) and the failure feature Grs that are stored in the failure feature DB 504, thereby estimating the failure causes corresponding to the failure features. The failure feature extracting unit 102 corresponds to the feature extracting unit that extracts a first statistical feature of recorded contents of internal processing of a communication apparatus. The failure feature DB 504 corresponds to the storing unit that stores a second statistical feature (for example, failure feature Gr) of the recorded contents at a time of occurrence of a past failure with a known failure cause. The failure cause list generating unit 505 corresponds to the failure cause estimating unit.

The failure cause list generating unit 505 then generates a list of failure causes that occur on the communication nodes to be analyzed, and stores the list into the network characteristic DB 105.

The input unit 510 makes inputs for storing past failure cases into the failure case DB 501.

Next, the knowledge forming section 211 presents the result of estimation of failure causes and the results of analysis on failure feature information and the like to a user. The knowledge forming section 211 also collects evaluation information based on the past experience of failure solving from a plurality of users who observe the presented information, and summarizes the collected evaluation information to form knowledge for failure estimation.

The knowledge forming section 211 includes an analysis result summarizing unit 506, a failure cause comprehensive judgment unit 507, the result display unit 108, an input unit 509, the failure feature DB 504 which is shared with the cause analysis section 201, and a user evaluation information summarizing unit 508. The result display unit 108 corresponds to the output unit that outputs first information including a statistical feature of the recorded contents at a time of occurrence of a failure, the feature being extracted by the feature extracting unit 102 from the recorded contents input. The input unit 509 corresponds to the input unit to which second information is input, the second information including at least one of the correspondence relation between a failure cause and the statistical feature and a point of interest of the statistical feature. The failure cause list generating unit 505 which is shared with the cause analysis section 210 corresponds to the failure cause estimating unit that estimates a failure cause based on the second information input.

The analysis result summarizing section 506 summarizes the results of analysis relevant to the communication nodes for the failure detecting unit 209 to detect a failure of The analysis result summarizing unit 506 collects the result of estimation on the distribution of causes of a failure occurring in the communication node from the failure detecting section 209, and also collects each individual failure feature occurring in the distribution of causes and users' evaluation information from the failure feature DB 504.

The failure cause comprehensive judgment unit 507 makes a comprehensive judgment on the failure cause of the communication node.

The result display unit 108 displays the result of comprehensive judgment and the summarized result of analysis on a display device such as a CRT.

The input unit 509 collects evaluation information based on the past experience of failure solving to be described later from users who observe the result of analysis on failure causes presented by the result display unit 108, through a keyboard, network, etc.

The user evaluation information summarizing unit 508 merges the evaluation information newly collected and the existing evaluation information stored in the failure feature DB 504 for re-tabulation, and stores the resultant in the failure feature DB 504 again.

Next, FIG. 9 is a configuration diagram showing the configuration of information that is stored in the failure feature DB 504.

With respect to each failure feature Gr formed by the failure feature grouping unit 502, the failure feature DB 504 contains an identification number, parameters that are determined from past failure cases corresponding to the failure features of the group, and parameters that are determined from values acquired from the knowledge forming section 211.

In the present embodiment, the observation amount is a multidimensional vector that contains the values of the numbers of occurrence of respective types of processes in the apparatus per unit time (i.e., the frequencies of appearance) as its elements.

Statistically-independent variation components extracted from the observation amount constitute a failure feature.

In such a case, the failure feature is a multidimensional vector that contains the frequencies of appearance of processes as its elements.

Here, the multidimensional vector may be subjected to normalization processing, if necessary, so that the elements have a certain maximum value.

As a means for extracting the statistically-independent variation components from the observation amount, the present embodiment uses the technique of independent component analysis, for example. The independent component analysis is detailed in Non-Patent Document 1.

As shown in FIG. 9, the parameters that are determined from past failure cases include characteristic parameters of the failure feature Gr, including N process types ("PRC-1 to PRC-N" in the diagram) corresponding to respective vector elements, averages of the frequencies of appearance of the processes ("Average of frequencies of appearance" in the diagram), and variance of the frequencies of appearance ("Variance of frequencies of appearance" in the diagram) of the multidimensional vector or failure features in the group.

The parameters determined from past failure cases further include the total number of past failure cases ("Total number of past cases" in the diagram), the names of the failure causes ("Failure cause 1 to Failure cause M" in the diagram), the numbers of occurrence of the respective failure causes ("Number of occurrence of failure cause" in the diagram), and a value that indicates the degree of deviation of the numbers of occurrence of the failure causes ("Dispersion of failure causes" in the diagram).

The parameters that are determined from the values acquired by the knowledge forming section 211 include the frequency distributions of users' evaluations on the relevance (relevant/irrelevant) of the processes PRC-1 to PRC-N to the failure causes ("User evaluations" on the characteristics of the failure feature Gr in the diagram), and the frequency distributions of users' evaluations on the relevance (relevant/irrelevant) of the respective failure causes 1 to M to the failure feature Gr ("User evaluation" corresponding to the failure causes in the diagram).

The parameters determined from the values acquired by the knowledge forming section 211 further include the identification numbers of other failure feature Grs having high similarity ("Identification number" of other failure feature Grs having high similarity in the diagram), the similarities to the original failure feature Gr ("Similarity" in the diagram), the frequency distributions of users' evaluations on the relevance (relevant/irrelevant) to the failure causes ("User evaluation" on other failure feature Grs having high similarity in the diagram), and the number of such user evaluations given to the system ("Total number of evaluations" in the diagram).

Figure 10:
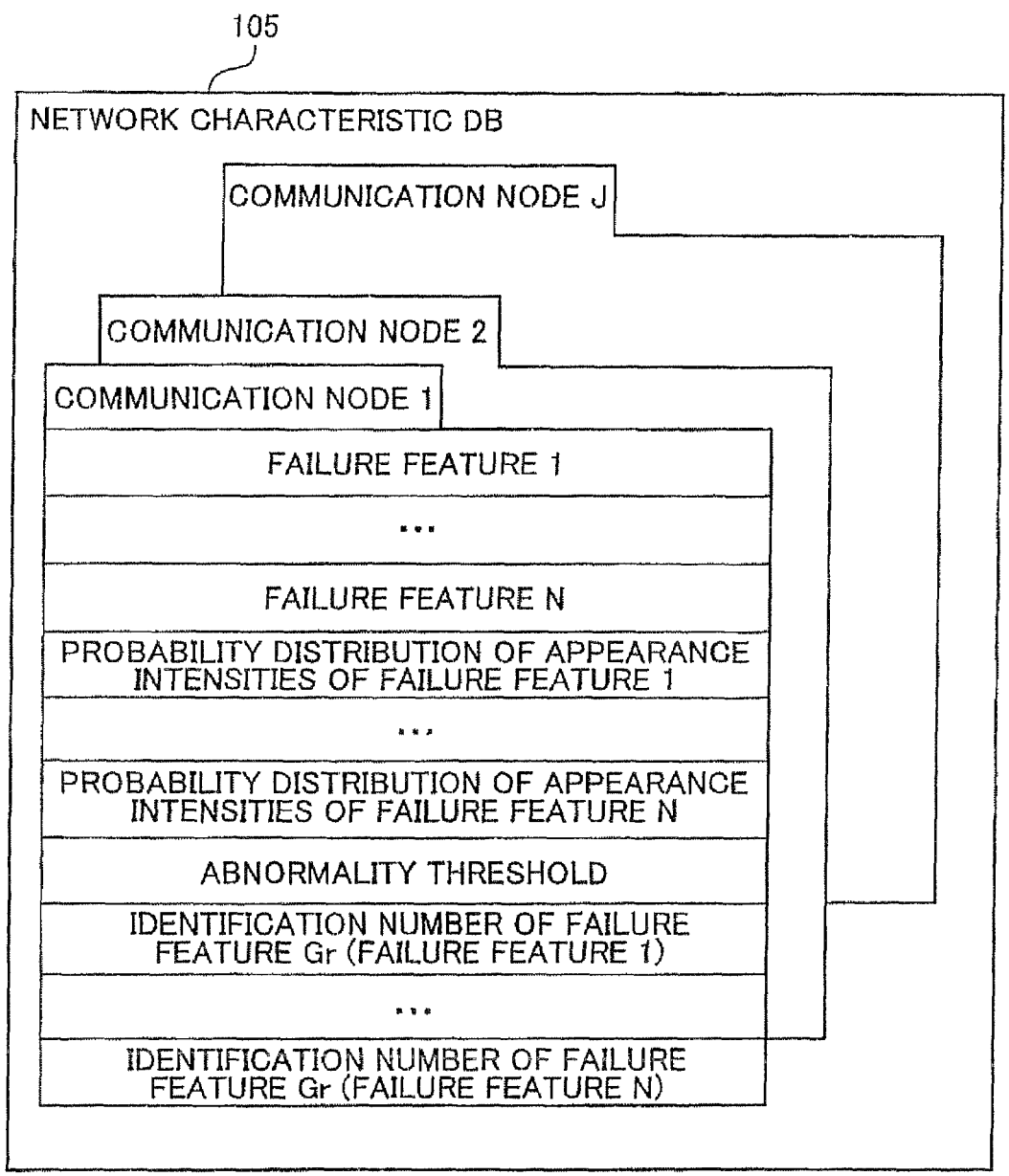
FIG. 10 is a configuration diagram showing the configuration of information that is stored in a network characteristic DB 105 according to Embodiment 1 of the present invention.

Next, FIG. 10 is a configuration diagram showing the configuration of information that is stored in the network characteristic DB 105 according to the present embodiment.

Figure 3:
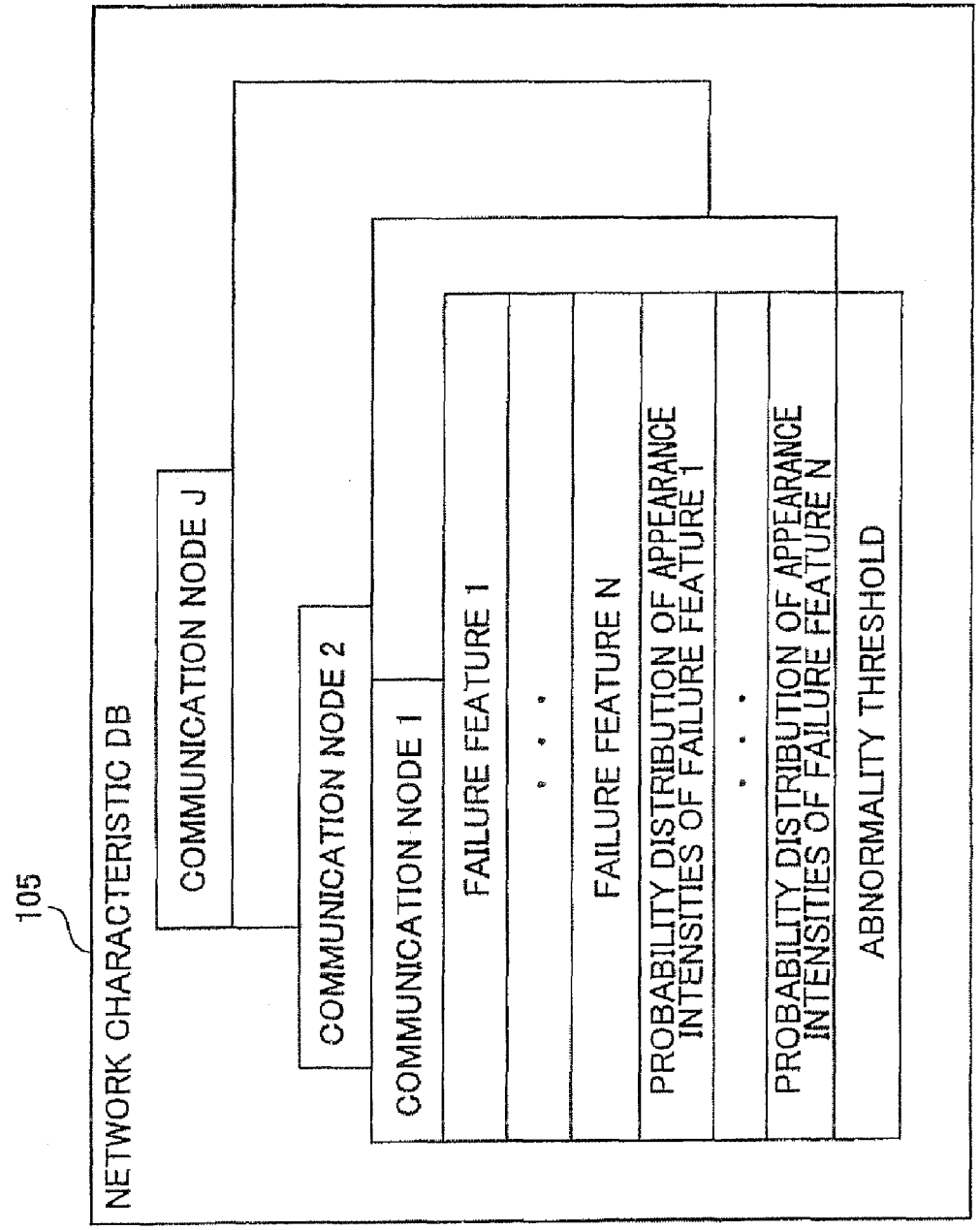
FIG. 3 is a configuration diagram of information that is stored in the network characteristic DB 105 according to Patent Document 3, a related technology.

In FIG. 10, the identification numbers of failure feature Grs that are associated with respective failure features by the failure cause list generating unit 505 (see FIG. 8) are stored in addition to the configuration shown in FIG. 3.

If there is no corresponding failure feature Gr, the information is so described.

Figure 11:
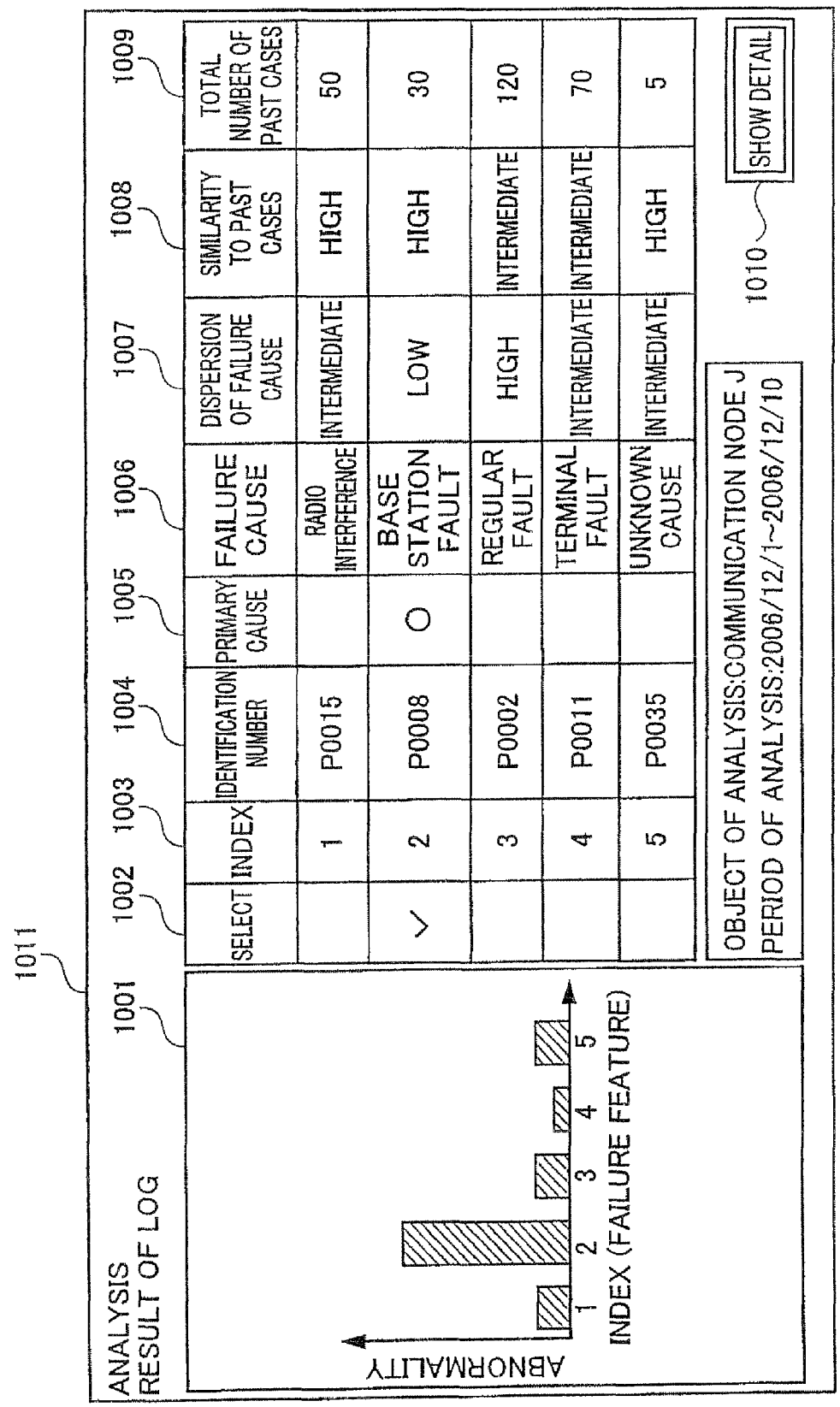
FIG. 11 is a diagram showing an example of display of the result of analysis according to Embodiment 1 of the present invention.
Figure 12:
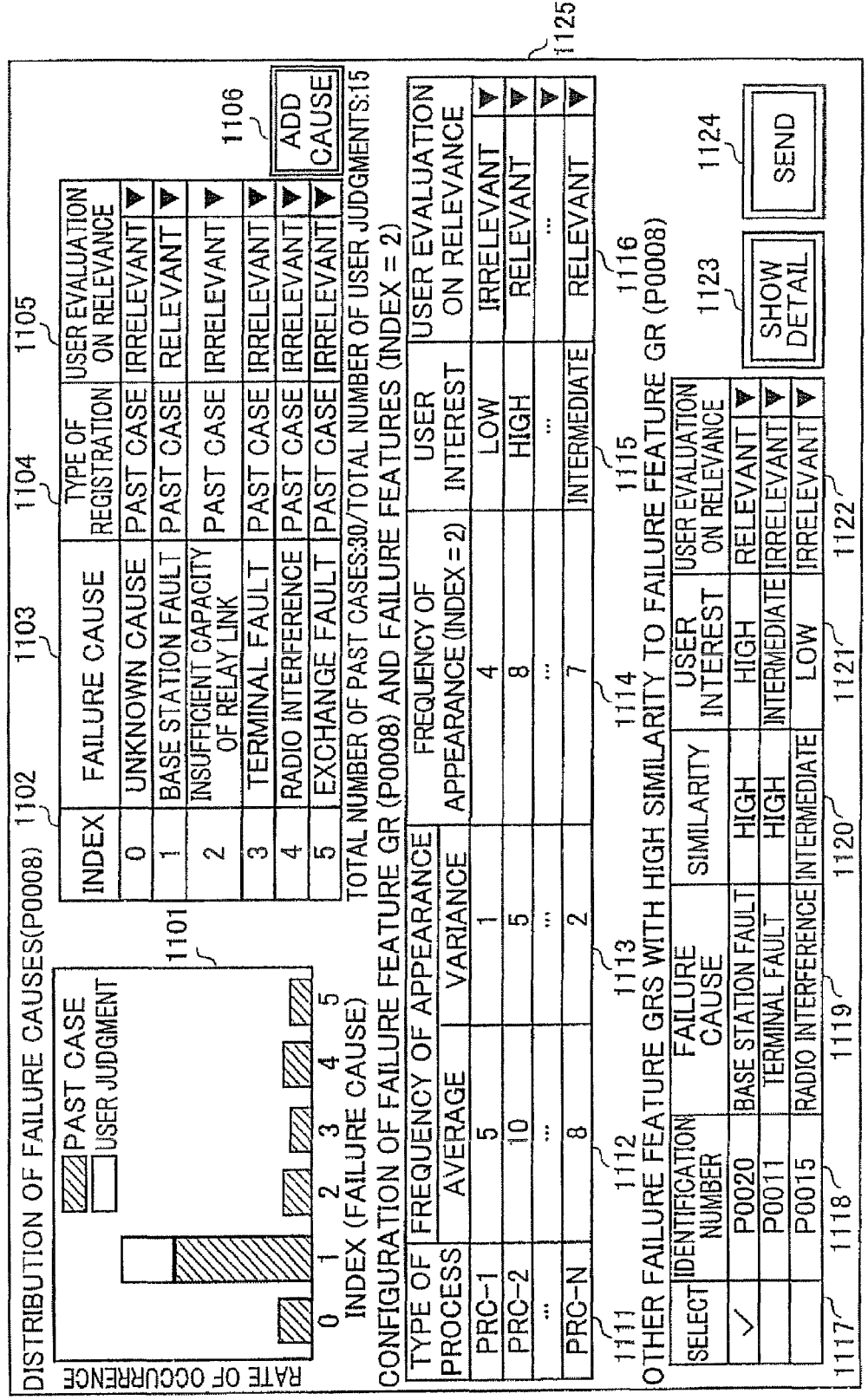
FIG. 12 is a diagram showing an example of display of the result of analysis according to Embodiment 1 of the present invention.

Now, the diagrams shown in FIGS. 11 to 13 show examples of display of the results of analysis to be displayed on the result display unit 108 of the knowledge forming section 211.

The analysis result 1011 shown in FIG. 11 is an example of display that shows the result of estimation on the causes of occurrence of a failure occurring in a communication node.

In the analysis result 1011, a graph 1001 shows the values of the abnormalities that are determined by the abnormality calculating unit 106 of the respective failure features extracted from the logs. Additional information on each failure feature is shown in a table from a column 1002 to a column 1009.

As for the additional information included in the table of FIG. 11, the column 1003 shows index numbers of the failure features.

The column 1004 shows the identification numbers of the failure feature Grs that are evaluated to have the highest similarity to the failure features by the failure cause list generating unit 505.

The column 1005 shows the result of judgment on a primary cause, made by the failure cause comprehensive judgment unit 507.

The column 1006 shows major failure causes that are estimated to correspond to the failure features by the failure cause list generating unit 505.

The column 1007 shows the degrees of dispersion of the causes corresponding to the failure features.

The column 1008 shows the degrees of similarity between the failure feature Grs specified by the identification numbers described in the column 1004 and the failure features.

The column 109 shows the total numbers of past cases that are associated with the failure feature Grs.

A user can obtain the result of estimation on the primary cause of one or a plurality of failures occurring in the communication node during the period of analysis by extracting the failure cause that is indicated as a primary cause in the result of judgment in the column 1005 from among the failure causes shown in the column 1006 of the table in the diagram.

Next, the result of analysis 1125 of FIG. 12 is an example of display of an interface for inputting detailed information on the failure feature Grs listed in the table of the analysis result 1011 and user's evaluation information.

The result of analysis 1125 shown in FIG. 12 is displayed when a row that includes the identification number of a failure feature Gr for detailed information to be displayed is selected in the column 1002 of FIG. 11 and a button 1010 (FIG. 11) is pressed.

The result of analysis 1125 of FIG. 12 shows information that is determined from the past failure cases associated with the failure feature Gr. The graph 1101 and the table shown with columns 1102 to 1105 show the distribution of failure causes.

In the result of analysis 1125 of FIG. 12, columns 1111 to 1116 show the configuration of the failure feature selected in the column 1002 and the characteristics of the failure features included in the failure feature Gr.

The table displayed with columns 1117 to 1122 shows other failure feature Grs that have high similarity.

The graph 1101 shows the numbers of occurrence of failure causes that are determined from the past failure cases associated with the failure feature Gr and the numbers of times users have evaluated that the failure causes listed in the column 1103 are relevant to the failure feature Gr in terms of rates with respect to the respective failure causes listed in the column 1103.

As for the information that is included in the table displayed with the columns 1102 to 1105, the column 1102 shows the index numbers of the failure causes.

The column 1103 shows the categories of the failure causes.

The column 1104 shows the types of registration of the failure causes.

The column 1105 provides an interface from which the user makes an evaluation on the relevance between the failure feature Gr and the failure causes.

For the type of registration, the column 1104 shows "Past case" if the category of the failure cause is extracted from the past failure cases. If the cause category is newly added by the user, the column 1104 shows "User registration".

To add a cause category, the user presses a button 1106 to create a new row. Then, the user can enter the category name of the failure cause in the column 1103 and press a button 1124 to register the category in the system.

A cause category is added when the user judges that there are only a small number of failure cases solved in the past and there is a true cause in a category other than those extracted from the failure cases, or when none of the past failure cases has been solved (when the analysis result 1011 shows "Unknown cause" in the column 1006).

Figures 13A, 13B:
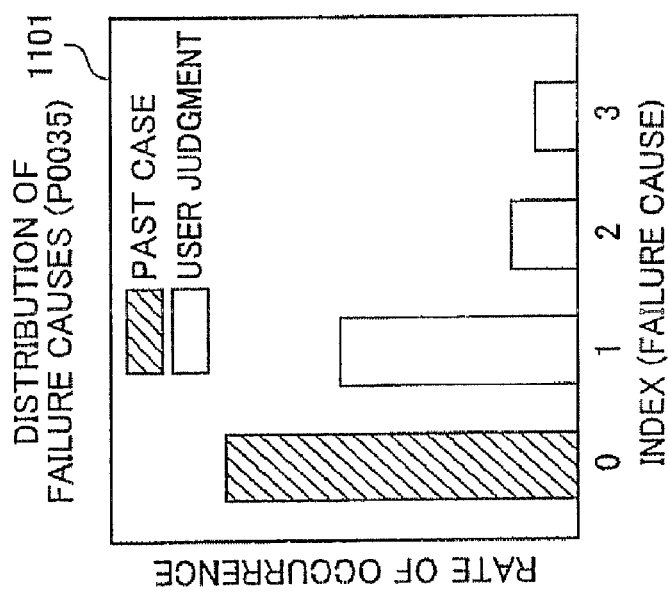
FIG. 13 is a diagram showing an example of display of the result of analysis according to Embodiment 1 of the present invention.

Next, FIG. 13 is an example of display of the graph 1101 (FIG. 12) and a table with the columns 1102 to 1105 (FIG. 12), which are displayed when a failure feature that is shown with "Unknown cause" in the column 1006 of the analysis result 1011 (FIG. 11) is selected. FIG. 13(A) is a diagram showing the graph 1101, and FIG. 13(B) the table.

From the result of display, it can be seen that the failure feature Gr with identification number P0035 is associated with 10 past failure cases unsolved, and a total of 10 evaluations have been given by users.

It is also shown that a fault of a base station, registered by a user, is estimated to have a high relevance to the failure feature Gr even by other users as a failure cause.

The user who observes the result estimates the failure cause by making a comprehensive judgment including the other information presented in the result of analysis 1125 of FIG. 12. The evaluation on the presented information is then reflected on the system through the interfaces in the columns 1103 and 1105.

In the table displayed with the columns 1111 to 1116 of FIG. 12, the column 1111 shows the types of processes.

The columns 1112 and 1113 of FIG. 12 show the averages and variances of the frequencies of appearance of the respective processes, determined from the past failure cases, with respect to the failure features included in the failure feature Gr.

The column 114 shows the frequencies of appearance of the processes that constitute the failure feature selected in the column 1002 from among the failure features determined from the logs of the communication node to be analyzed.

The column 1115 shows the degrees of interest to be given to the processes when estimating the cause, the degrees being determined from evaluations collected from a plurality of users.

The column 1116 provides an interface from which the user makes an evaluation on the relevance between the processes and the failure cause.

In the table displayed with the columns 1117 to 1122 of FIG. 12, the column 1118 shows the identification numbers of other failure feature Grs that have high similarity to the failure feature Gr selected in the column 1002.

The column 1119 shows the primary failure causes thereof.

The column 1120 shows the degrees of similarity.

The column 1121 shows the degrees of interest to be given to the other failure feature Grs having high similarity when estimating the cause, the degrees being determined from the evaluations collected from a plurality of users.

The column 1122 provides an interface from which the user makes an evaluation on the relevance between the other failure features Gr having high similarity and the failure cause.

When a failure feature Gr is selected in the column 1117 and a button 1123 is pressed, the result of estimation as to the selected failure feature Gr, similar to the result of analysis 1125, is displayed on-screen.

(2) Operation of Failure Cause Analysis System

Next, the operation of Embodiment 1 according to the present invention will be described in detail with reference to the flowcharts and diagrams shown in FIGS. 14 to 21.

Figure 14:
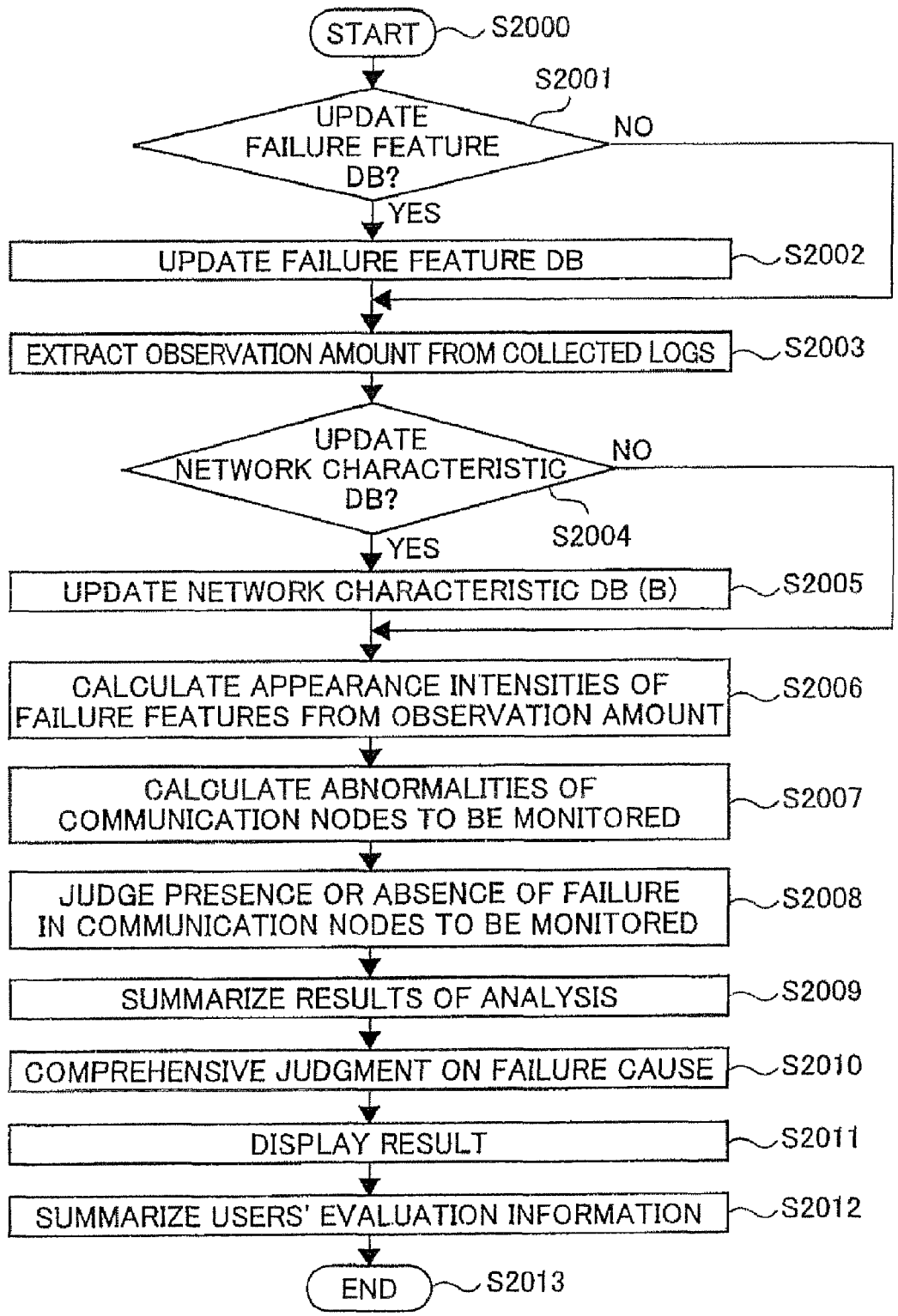
FIG. 14 is a flowchart for explaining the operation of the failure analysis system according to Embodiment 1 of the present invention.

FIG. 14 is a flowchart for explaining the operation of the failure analysis system according to the present embodiment.

In the present embodiment, the procedure is initially started at step S2000. At step S2001, it is determined whether to update the failure feature DB 504 or not.

If the failure feature DB 504 is not constructed yet or if the stored information is old and it is determined to update the failure feature DB 504, the failure feature DB 504 is updated at step S2002 (the update of the failure feature DB 504 will be detailed in (2-1) Processing for updating failure feature DB to be described later).

Next, the observation amount extracting unit 101 extracts observation amount from logs that are collected from the network management system 206 by the log collecting unit 100 (step S2003).

Then, it is determined whether to update the network characteristic DB 105 or not (step S2004).

If the network characteristic DB 105 is not constructed yet or if the stored information is old and it is determined to update the network characteristic DB 105, the network characteristic DB 105 is updated at step S2005 (update pattern B will be described later).

Figure 4:
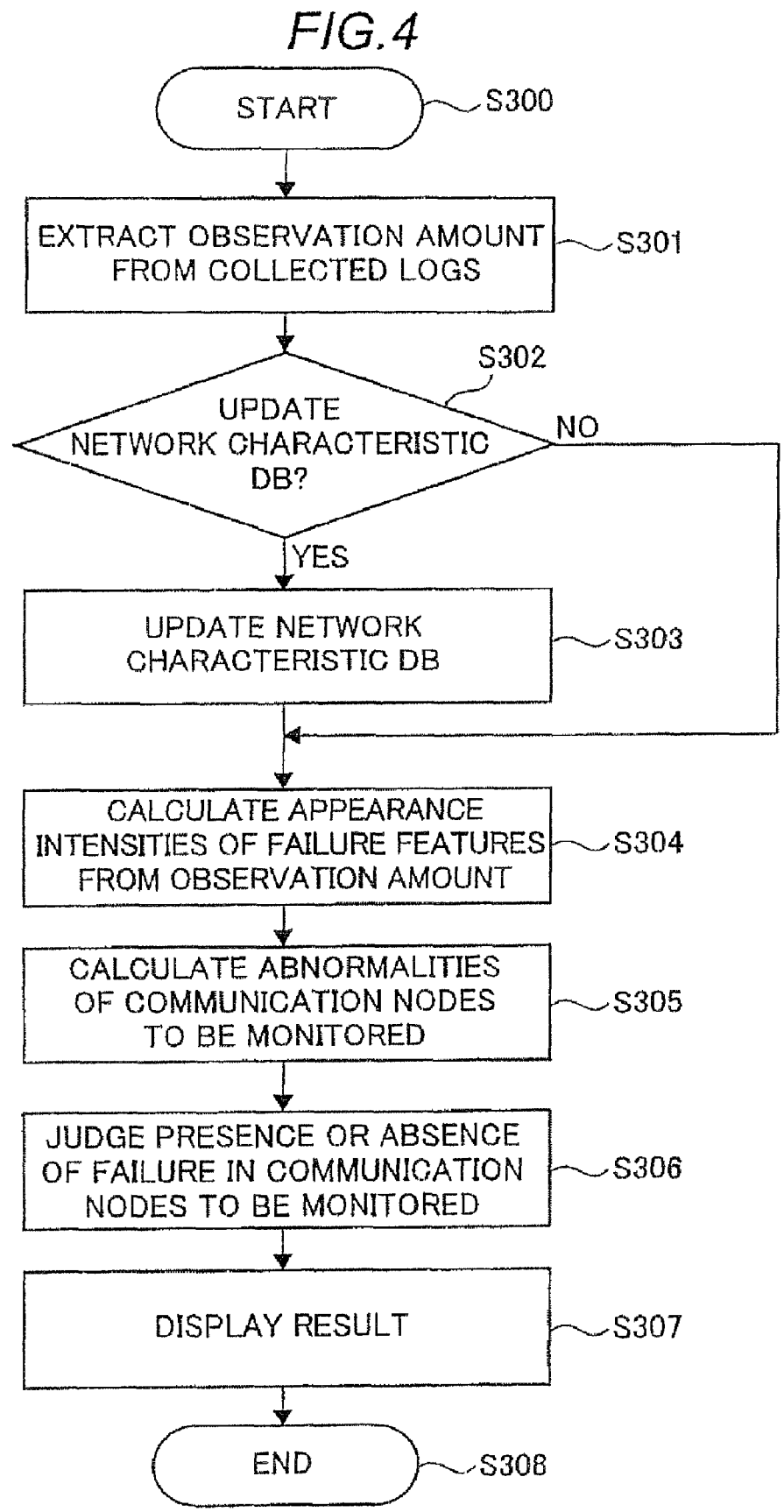
FIG. 4 is a flowchart for explaining the operation of the failure detection system of a communication network according to Patent Document 3, a related technology.

Steps S2006 to S2008 provide the same processing as that of steps S304 to S306, respectively, which have been described with reference to FIG. 4.

At step S2009, necessary information is acquired from the failure detecting unit 107 and the failure feature DB 504 to generate the analysis result 1011 and the result of analysis 1125 which are shown in FIGS. 11 and 12. The results of analysis are output to the result display unit 108.

Here, the column 1006 (FIG. 11) in the analysis result 1011 shows failure causes, for example, that have the highest rates of occurrence in the graph 1101 among the failure causes occurring in the distribution of causes corresponding to the failure feature Gr, as major failure causes corresponding to the failure features.

If the past failure cases are few in number and failure causes have thus been registered by users, such causes are also taken into account in determining the major failure causes.

The column 1008 (FIG. 11) shows the degrees of similarity between the failure feature Gr and the failure features to be described later.

To display the degrees of similarity in a categorized form such as high/intermediate/low, unique ranges of values are assigned to the respective categories in advance. The degrees of similarity are then displayed according to their numerical values as converted into the categories the ranges of which the numerical values fall within.

To display the degrees of interest in the columns 1115 and 1121 in the result of analysis 1125 (FIG. 12), unique ranges of values are assigned to respective categories such as high/intermediate/low in advance. The ratios of the numbers of "relevant" with respect to the total number of user evaluations are determined, and the degrees of interest are displayed according to the ratios as converted into the categories the ranges of which the values fall within.

At step S2010, the failure causes that are considered to be the major causes of the failure occurring in the communication node, among the failure causes corresponding to the failure features extracted from the logs, are summarized at step S2009. The summarized information is comprehensively evaluated for judgment, and the result of judgment is displayed in the column 1005 in the analysis result 1011.

The comprehensive evaluation is made, for example, by such a method as extracting a failure cause Gr that has small dispersion of failure causes and high similarity to failure features (high similarity to the past cases) as to failure features of high abnormalities, and regarding the failure cause in the column 1006 (FIG. 11) corresponding to that failure cause Gr as the primary failure cause.

At step S2011, the results of analysis such as the analysis result 1011 and the result of analysis 1125 are displayed on the result display unit 108 (FIG. 8).

At step S2012, evaluation information is collected through the input unit 509 from the user who observes the results of analysis, and merges the evaluation information with the existing evaluation information stored in the failure feature DB 504 for re-tabulation. The result of tabulation is stored into the failure feature DB 504.

(2-1) Operation of Processing for Updating Failure Feature DB

Figure 15:
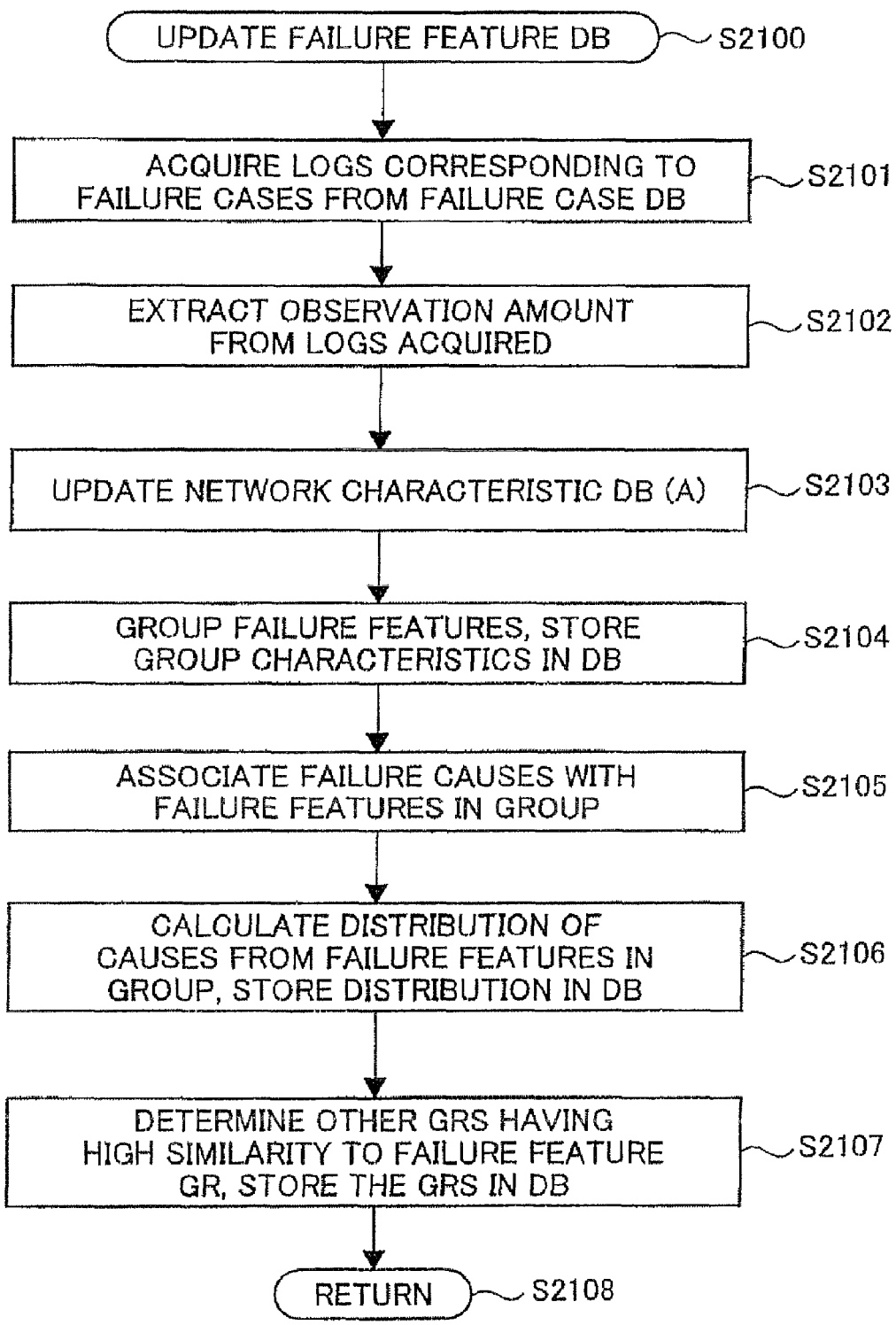
FIG. 15 is a flowchart for explaining the operation of processing for updating the failure feature DB 504 according to Embodiment 1 of the present invention.

FIG. 15 is a flowchart for explaining the operation of the processing for updating the failure feature DB 504 at step S2002.

Initially, the procedure is started at step S2100. At step S2101, logs corresponding to the failure cases are acquired from the failure case DB 501 through the log collecting unit 100.

At step S2102, the observation amount extracting unit 101 extracts observation amount from the logs acquired.

At step S2103, the network characteristic DB 105 is updated (the update pattern A will be described later).

Next, the failure feature grouping unit 502 groups the failure features output from the failure feature extracting unit 102 (FIG. 7) according to the similarity between the failure features, and stores group characteristics to be described later into the failure feature DB 504 (step S2104).

Subsequently, the failure feature DB constructing unit 503 acquires the past case DB 501 the failure causes corresponding to the logs from which the failure features are extracted, and associates the failure causes with the respective failure features (step S2105).

Since each individual failure feature is associated with a failure cause, the grouping of the failure features produces groups that include one or a plurality of failure causes as their elements.

From the failure feature(s) in the groups, the distribution of the numbers of occurrence of the failure causes associated with the failure feature(s) is determined and stored into the failure feature DB 504 (step S2106).

The processing of step S2106 is performed by the failure feature DB constructing unit 503.

Finally, at step S2107, other failure feature Grs having high similarity to the failure feature Gr are determined, and their values are stored into the "identification number" and "similarity" of "other failure feature Grs having high similarity" in the failure feature DB 504.

Here, the similarity between failure feature Grs is evaluated in terms of the measurement of similarity that in used in the grouping of failure features to be described later, and more particularly in terms of a Euclidean distance between the representative points of the failure feature Grs. After the values are stored, the procedure proceeds to step S2003 (step S2108).

(2-2) Operation of Grouping Processing Based on Similarity

Figure 16:
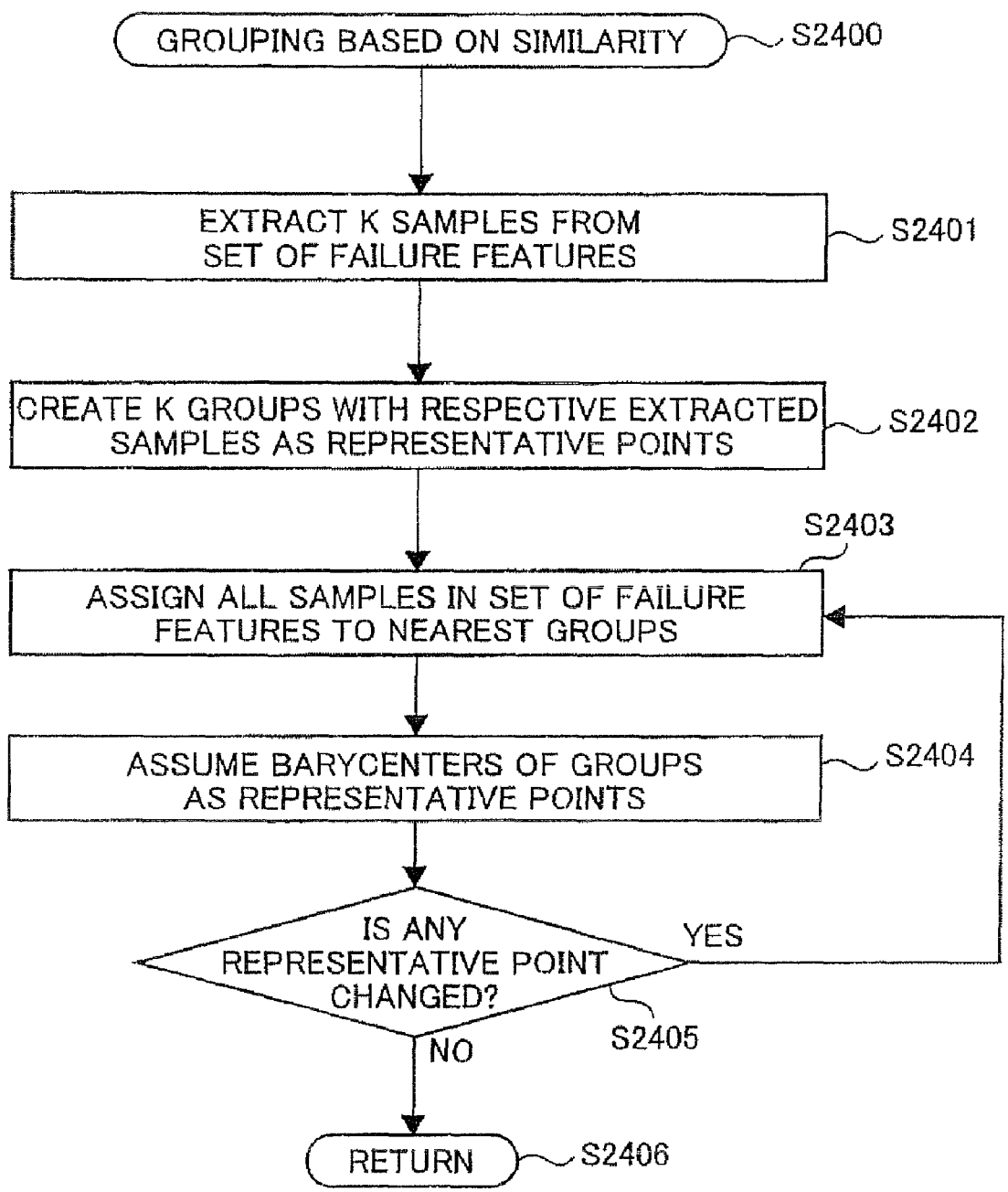
FIG. 16 is a flowchart for explaining the operation of a technique for grouping failure features based on similarity according to Embodiment 1 of the present invention.

FIG. 16 is a flowchart for explaining the operation of the technique for grouping failure features according to the similarity between the failure features.

The present embodiment deals with the case where k-Means clustering is used as an example of the technique, whereas other grouping techniques may be used.

Such grouping techniques are detailed in Non-Patent Document 2.

While the present embodiment shows an embodiment where the Euclidean distance is used as the measurement of similarity between failure features, other measurements of similarity may be used.

Note that when a distance is used as the measurement of similarity, the similarity shall be regarded higher (the degree of similarity higher) as the distance is smaller.

The grouping of the present embodiment is initially started at step S2400. K samples are extracted from a set of failure features in advance (step S2401).

Next, K groups are created with the extracted samples as respective representative points (step S2402).

Subsequently, Euclidean distances are determined between the rest of the samples in the set of failure features and the representative points of the K groups. Each sample is assigned to a group that minimizes the distance to the representative point (step S2403).

The representative points of the groups are updated to the mean vectors (barycentric vectors) of the failure features within the groups (step S2404).

Here, if the representative points vary in value before and after the update, the procedure returns to step S2403. If not, the grouping is considered to be completed and the procedure is ended (steps S2405, S2406).

By the foregoing processing, K groups are created from the set of failure features.

(2-3) Description of Operation for Grouping Features of Failure Causes

FIG. 17(a) is a diagram showing groups of features of failure causes that are obtained by the grouping processing based on similarity.

Figure 18:
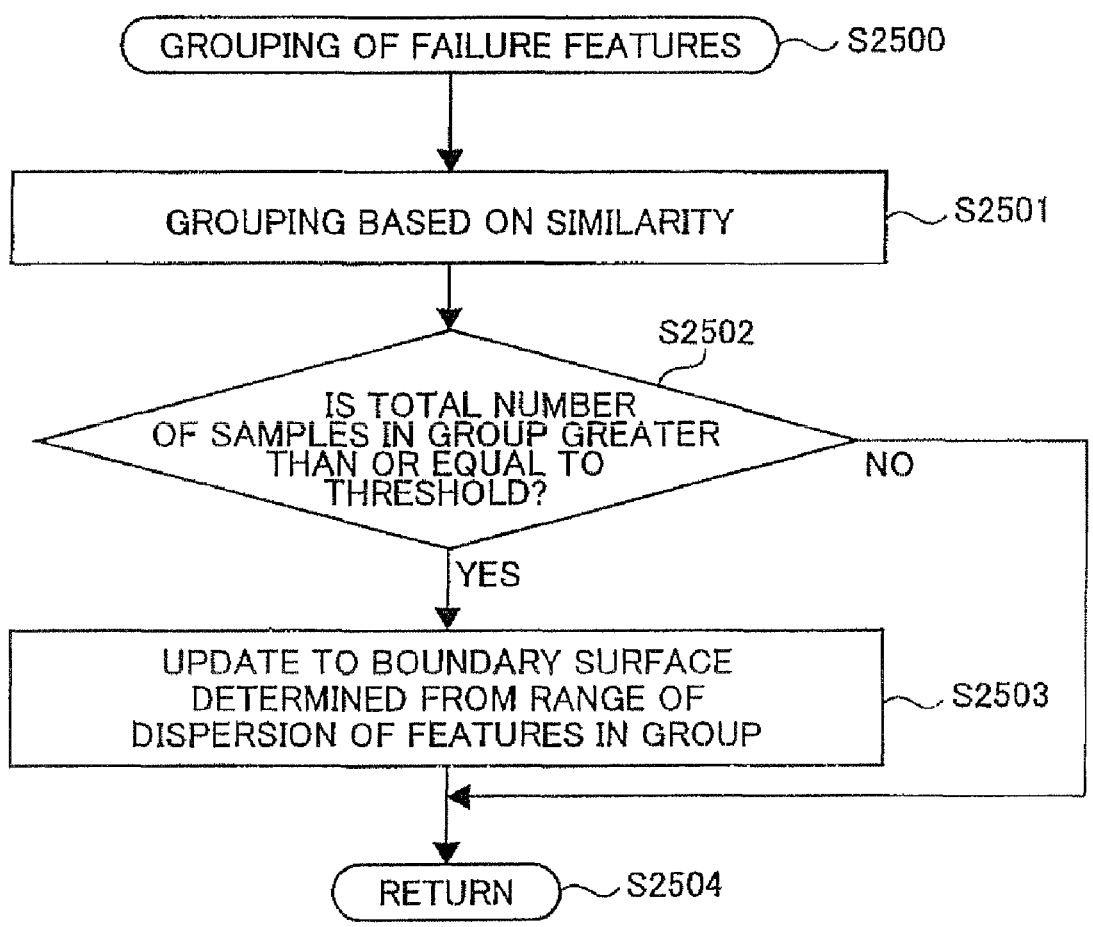
FIG. 18 is a flowchart for explaining the operation of the technique for grouping failure features according to Embodiment 1 of the present invention.

The operation of the processing for grouping failure features will now be described with reference to the flowchart of FIG. 18.

FIG. 17(a) shows the result of grouping of failure features that are extracted from the logs of past cases corresponding to failure causes 1 to 3 and the logs of unsolved past cases with unknown causes (step S2501).

The result is divided into regions 1201 to 1203 by boundary surfaces 1207 to 1209. The regions 1201 to 1203 provide groups of features of failure causes which are distributed around the respective representative points 1204 to 1206.

Figure 17:
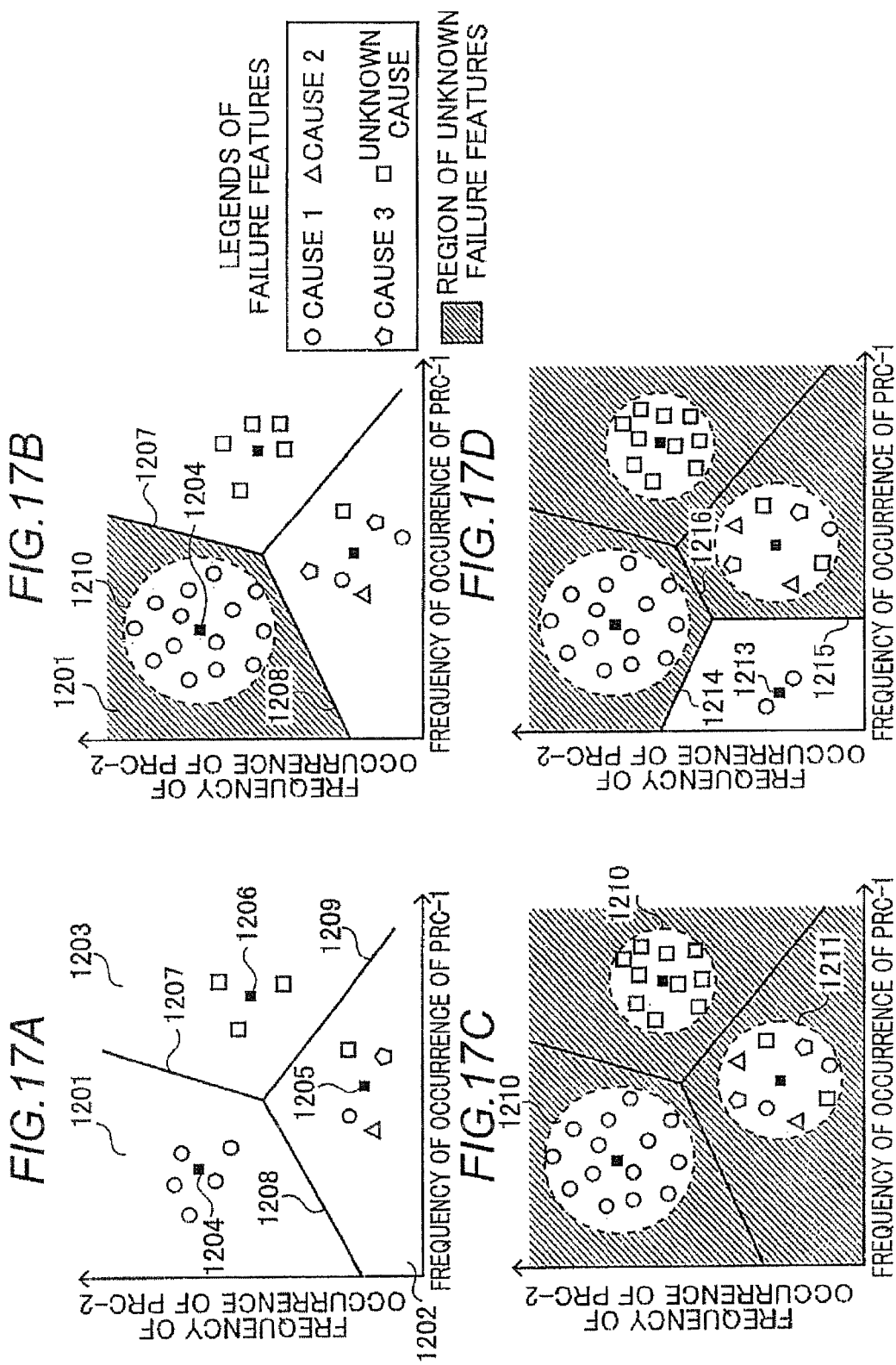
FIG. 17 is a diagram for explaining the technique for grouping failure features according to Embodiment 1 of the present invention.

For the sake of simplicity, FIG. 17 shows the groups on a two-dimensional plane, whereas actual groups are distributed in a multidimensional space.

In the present embodiment, if there are too few failure cases to quantify the range of dispersion of failure features in a group, such boundary surfaces 1207 to 1209 that perpendicularly split the intervals between adjoining representative points into equal halves as shown in FIG. 17(a) are used as the group boundary.

If the total number of failure features in a group exceeds a predetermined threshold (step S2502), on the other hand, a boundary surface determined from the range of dispersion of the failure features in the group is used as a new boundary surface of the group (step S2503).

In the present embodiment, a new boundary surface is determined from the range of dispersion of failure features in a group in the following way.

Initially, assume that the dispersions of failure features are in a multidimensional Gaussian distribution, and that the distribution of failure features x in the group conforms to a probability density function p(x) of multidimensional Gaussian distribution given by the equation (1):

[Equation 1]

$$p(x) = \frac{1}{(2\pi)^{N/2}|\Sigma|^{1/2}} \exp\left\{-\frac{1}{2}(x-\mu)^t \Sigma^{-1}(x-\mu)\right\} \quad (1)$$

where μ is a mean vector and E is a covariance matrix, both of which are determined from the samples in the group.

N is the dimension of the multidimensional vector x.

The new boundary surface is a set of points having the same probability density, i.e., a surface of equal probability in terms of the probability density function p(x). The boundary surface is determined under the condition that the volume inside the boundary surface, i.e., the probabilities of appearance of failure features x in the region sectioned by the boundary surface are higher than or equal to a predetermined threshold Pth.

The failure features x that fall within the region sectioned by such a boundary surface are given by the expression (2):

[Equation 2]

$$V_N |\Sigma|^{1/2} r^N \rangle P_{th} \quad (2)$$

$$V_N = \begin{cases} \dfrac{\pi^{N/2}}{(N/2)!} & \ldots \text{IF } N \text{ IS AN EVEN NUMBER} \\ \dfrac{2^N \pi^{(N-1)/2}\left(\dfrac{N-1}{2}\right)!}{N!} & \ldots \text{IF } N \text{ IS AN ODD NUMBER} \end{cases}$$

$$r = \{(x-\mu)^t \Sigma^{-1}(x-\mu)\}^{1/2}$$

The method of calculating the volume inside the boundary surface is detailed in Non-Patent Document 2.

FIG. 17(*b*) shows a state where a new boundary surface 1210 is provided in the group corresponding to the representative point 1204.

Of the region 1201, the area that does not include the representative point 1204 with respect to the boundary surface 1210 belongs to none of the groups that are determined from the past failure cases. In the present embodiment, such an area is considered as a region corresponding to unknown failure features (region of unknown failure features).

FIG. 17(*c*) shows a state where new boundary surfaces 1210 to 1212 are provided in all the groups corresponding to the representative points 1204 to 1206 as a result of an increase of past failure cases.

If any failure feature extracted from a new failure case appears in a region of unknown failure features, the grouping is performed again.

FIG. 17(*d*) shows a state where a new group is added around a representative point 1213 after re-grouping from the state of FIG. 17(*c*).

(2-4) Operation of Processing for Grouping Failure Features

The distributions of causes corresponding to failure feature Grs may include one that shows a uniform distribution of various types of failure causes, such as the distribution of causes obtained from the group that is sectioned by the boundary surface 1211 of FIG. 17(*c*).

In the present embodiment, such a failure feature Gr is considered to correspond to process faults (regular faults) that regularly occur in the communication network independently of certain failure causes.

To make such a judgment, according to the present embodiment, the degree of dispersion of the failure causes is calculated from the distribution of the numbers of occurrence of the failure causes, and stored in the failure feature DB 504.

The present embodiment will deal with the case of using a Herfindahl index with quantified distribution deviations as an example of the method for quantifying the degree of deviation of the failure causes. Other methods for quantifying distribution deviation may be used, however.

The Herfindahl index is given by the equation (3):

[Equation 3]

$$HI = \sum_{i=1}^{N} (u_i^2) \quad (3)$$

where the parameter ui is the rate of occupancy of an i-th parameter in a set of N parameters.

The Herfindahl index has a range of 1/N to 1. The more deviated the distribution is, the closer to 1 the value of the Herfindahl index is. The more uniform the distribution is, the closer to 1/N the index value is.

In the present embodiment, the Herfindahl index is determined with the parameter ui as the rate of occurrence of the i-th failure cause in the N failure causes. The smaller the Herfindahl index is, the greater the dispersion of the failure causes is considered to be.

In the present embodiment, an average and variance of the failure features included in the group created are determined as the characteristics of the group, with respect to each element of the multidimensional vectors of the failure features. The average and variation are stored in "average of frequencies of appearance" and "variance of frequencies of appearance" in the failure feature DB 504, respectively.

The number of failure features included in the group is stored in "total number of past cases" in the failure feature DB 504.

Figure 19:
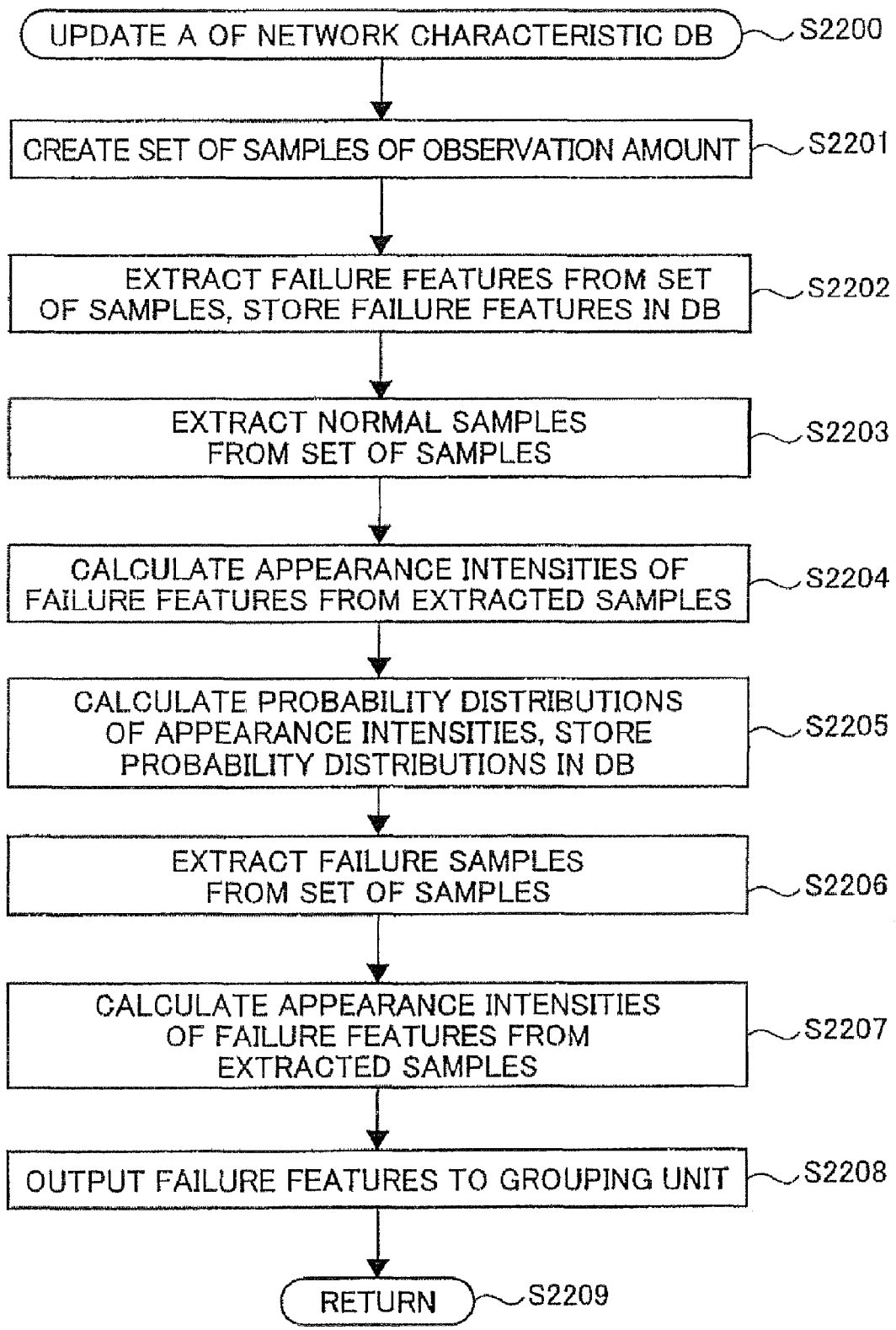
FIG. 19 is a flowchart for explaining the operation of the processing for updating the network characteristic DB 105 (update pattern A) according to Embodiment 1 of the present invention.

(2-5) Operation of Processing for Updating Network Characteristic DB in Update Pattern A Next, FIG. 19 is a flowchart for explaining the operation of the processing for updating the network characteristic DB 105 (update pattern A) at step S2103 (FIG. 15).

Figure 5:
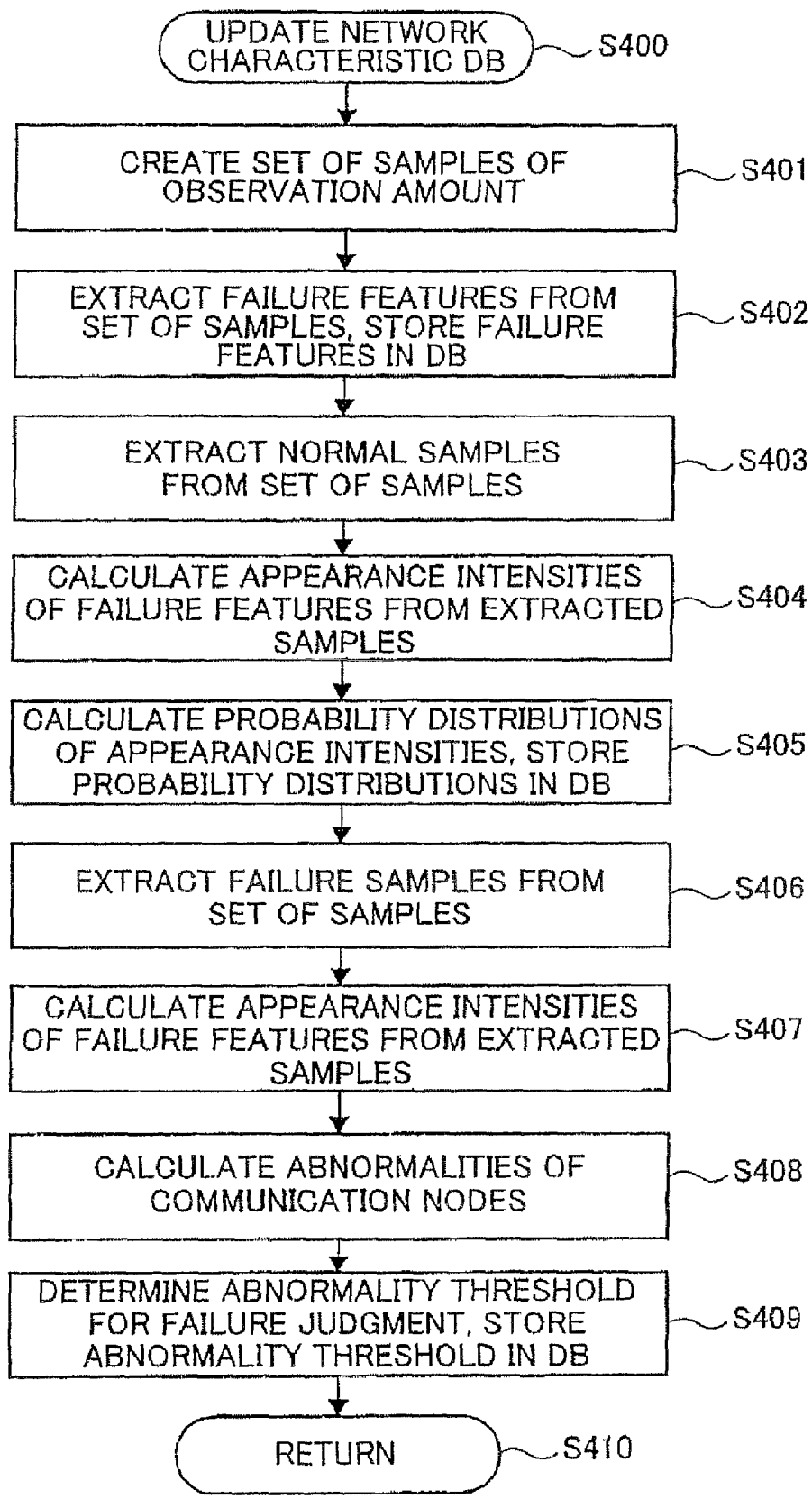
FIG. 5 is a flowchart for explaining the operation of process of the network characteristic DB 105 according to Patent Document 3, a related technology.

The operation of steps S2201 to S2207 shown in FIG. 19 is the same as that of steps S401 to S407 shown in FIG. 5, respectively. Description thereof will thus be omitted.

At step S2208, the failure features extracted by the failure feature extracting unit 102 at step S2202 are output to the failure feature grouping unit 502.

The failure features to be output here shall be only those of failure samples with high abnormality. Features irrelevant to failures shall be excluded from the grouping.

Figure 20:
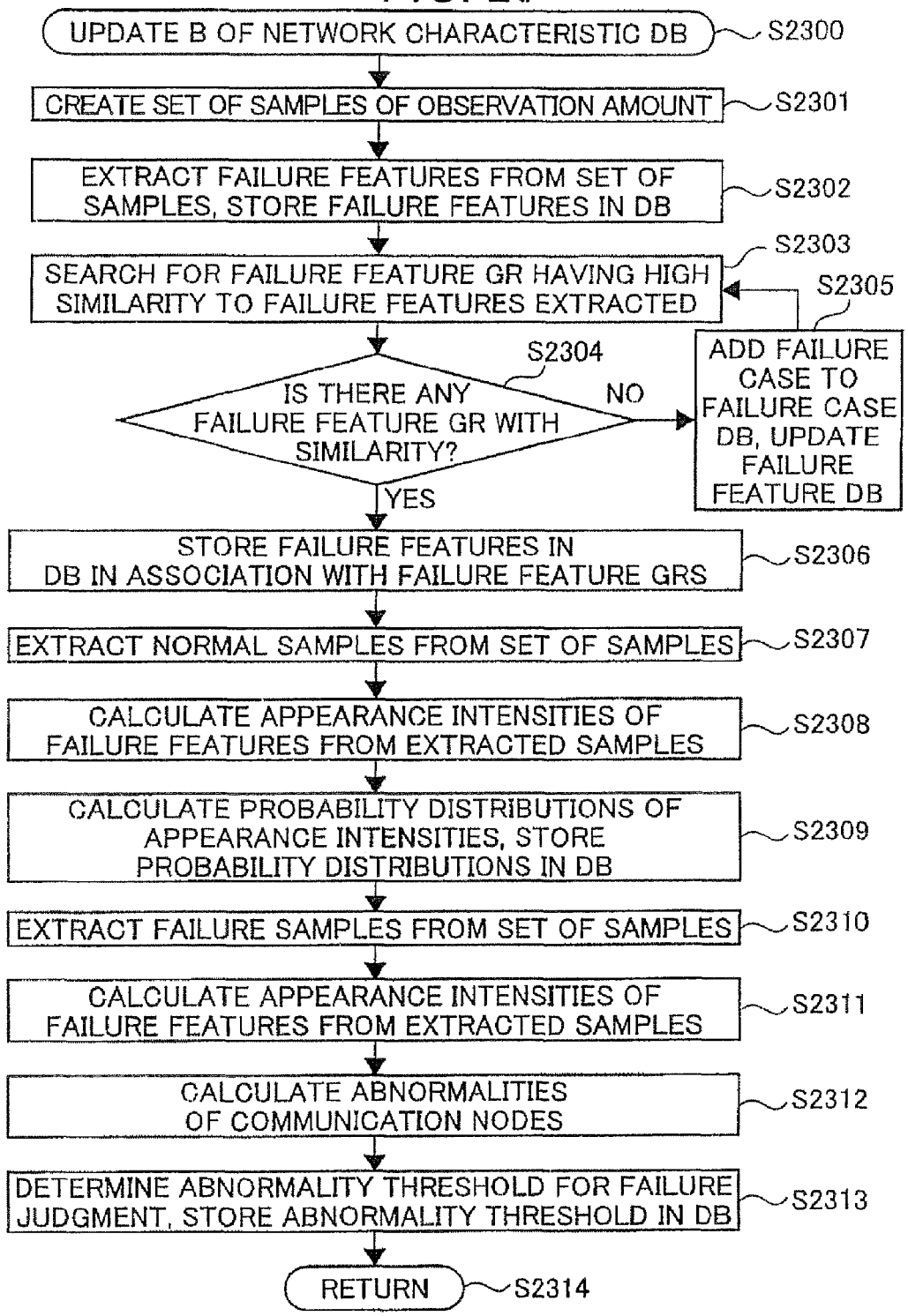
FIG. 20 is a flowchart for explaining the operation of the processing for updating the network characteristic DB 105 (update pattern B) according to Embodiment 1 of the present invention.

(2-6) Operation of Processing for Updating Network Characteristic DB in Update Pattern B Next, FIG. 20 is a flowchart for explaining the operation of the processing for updating the network characteristic DB 105 (update pattern B) at step S2005 (FIG. 14).

Note that the only difference from FIG. 5 lies in the section of steps S2303 to S2306 in FIG. 20. Hereinafter, the operation of that section alone will be detailed with reference to the drawings.

In the present embodiment, the failure cause list generating unit 505 initially searches the failure feature DB 504 for failure features Gr that have high similarity to the failure features extracted from the observation amount by the failure feature extracting unit 102 (step S2303).

If it is determined that there is any failure feature Gr having high similarity, the identification number of the failure feature Gr is stored into the network characteristic DB 105 in association with the failure features (step S2304).

On the other hand, if the failure feature Grs generated from the past cases include no failure feature Gr that has high similarity to the failure features extracted from the logs of the communication nodes to be analyzed, it is considered that there has occurred an unknown failure of unknown cause.

In such a case, the failure case is added to the failure case DB 501 and the processing of updating the failure feature DB 504 is performed at step S2305. The procedure then returns to step S2303.

(2-7) Detection of Failure Feature Gr Having High Similarity to Failure Features Next, FIG. 21 is a flowchart for explaining the operation of the processing for detecting a failure feature Gr having high similarity to failure features at step S2303.

The similarity between a failure feature and a failure feature Gr is evaluated in terms of the measurement of similarity that in used in the grouping, and more particularly in terms of a Euclidean distance between the failure feature and the representative point of the failure feature Gr.

Suppose here that there is provided users' evaluation information on the relevance of the types of processes that constitute a failure feature to the failure cause and it is possible to calculate the degrees of interest. In such a case, the Euclidean distance between the failure feature and the representative point, both of which are a multidimensional vector, are calculated with the vector elements multiplied by respective weighting factors.

The weighting factors shall be values in the range of 0 to 1 into which the degrees of interest are converted (the higher the degree of interest, the closer to 1 the value is).

The multiplication of the weighting factors can suppress the influences that the dispersions of elements highly likely to be irrelevant to the failure might have on the calculation when evaluating the similarity.

When detecting a failure feature Gr having high similarity to a failure feature, in the present embodiment, a failure feature Gr having a representative point that lies at the minimum distance from the failure feature is initially extracted (step S2601).

Next, it is determined if the total number of samples in the failure feature Gr extracted is greater than or equal to a predetermined threshold (step S2602).

If the total number of samples is smaller than the threshold and there is provided no boundary surface that is determined from the range of dispersion of failure features, the failure feature Gr extracted is considered as the failure feature Gr having high similarly to the failure feature.

If the total number of samples is greater than or equal to the threshold, on the other hand, it is determined whether the failure features x satisfy the condition of the expression (2) (step S2603).

If the condition is satisfied, the failure feature Gr extracted is considered as the failure feature Gr having high similarly to the failure feature.

If the condition is not satisfied, i.e., if the failure feature falls on a region of unknown failure features which is defined in the present embodiment, it is considered that there is no failure feature group Gr having high similarity.

FIG. 22 is a diagram for explaining an example where failure features extracted from a log of a new failure are associated with failure feature Grs according to the operation of FIG. 21.

FIG. 22 is the same as FIG. 17(*b*) except for failure features 1217 to 1219 that are extracted from the log of a new failure.

In the example of FIG. 22, the failure feature 1217 has a minimum distance to the representative point 1205, and is thus associated with the failure feature Gr corresponding to the representative point 1205 at step 2306.

The failure feature 1218 has a minimum distance to the representative point 1204 and falls on the side of the representative point 1204 with respect to the boundary surface 1210 which is determined by the condition of the expression (2). The failure feature 1218 is thus associated with the failure feature Gr corresponding to the representative point 1204.

On the other hand, the failure feature 1219 lies in the region of unknown failure features, and it is determined that there is no failure feature Gr having high similarity. A new corresponding failure case is thus added to the failure case DB 501 at step S2305.

Now, the present embodiment has been dealt with the case where the failure cause analysis system 208 includes the cause analysis section 210, the failure detecting section 209, and the knowledge forming section 211. However, the present embodiment is not limited thereto.

For example, the failure cause analysis system 208 may be a single apparatus that includes the cause analysis section 210, the failure detecting section 209, and the knowledge forming section 211. The failure cause analysis system 208 may be composed of a plurality of apparatuses.

The components of the failure cause analysis system described above may be implemented by a CPU or other control unit's executing processing (control) according to a control program that is stored in a storing unit such as a memory and a hard disk. For example, a computer such as shown in FIG. 23 may be used to constitute the failure cause analysis system and implement the functions. Note that while the following description will deal with a single computer, the failure cause analysis system may be constituted by a plurality of computers.

FIG. 23 is a block diagram showing an example of configuration of the computer that constitutes the failure cause analysis system according to the present embodiment.

A program that describes all or part of the functions of the failure detecting section 209, the cause analysis section 210, and the knowledge forming section 211 of the failure cause analysis system 208 is stored in a disk drive 605 such as a hard disk drive. The data of the failure case DB 501, the failure feature DB 504, and the network characteristic DB 105 is also stored in the disk drive 605. A CPU 604 executes the program for implementing all or part of the functions of the failure detecting section 209, the failure analysis section 210, and the knowledge forming section 211. An input unit 601 corresponds to the input units 510 and 509, and functions as an input device such as a keyboard. A display unit 602, such as a CRT, corresponds to the result display unit 108. Designated by 606 is a bus such as a data bus, and 603 a memory such as a DRAM which stores information necessary for the information processing of the CPU 604.

The program may be stored in a computer-readable information recording medium such as FD (floppy disk), CD-ROM, DVD, and flash memory. While a disk drive is used as the storing unit in FIG. 23, the program recorded on a computer-readable information recording medium such as FD and CD-ROM may be read into the disk drive of the computer to perform processing so that the computer functions as the failure cause analysis system.

Up to this point, a representative embodiment of the present invention has been described. However, the present invention may be carried out in various other forms without departing from its spirit or essential characteristics set forth by the appended claims. The foregoing embodiment is therefore to be considered as mere illustrative and not restrictive. The scope of the invention shall be indicated by the appended claims rather than by the description of the specification or abstract. All changes and modifications which come within the meaning and range of equivalency of the claims are intended to be embraced within the scope of the present invention.

The invention claimed is:

1. A failure cause analysis system for estimating a cause of a failure in a communication network from recorded contents of internal processing of a communication apparatus, the system comprising:
   a feature extracting unit that extracts a first statistical feature of the recorded contents at a time of occurrence of a failure from the recorded contents input;
   a storing unit that stores a second statistical feature of the recorded contents at a time of occurrence of a past failure with a known failure cause; and
   a failure cause estimating unit that estimates a failure cause based on similarity between the first statistical feature and the second statistical feature.

2. The failure cause analysis system according to claim 1, wherein
   the feature extracting unit extracts the first statistical feature from the recorded contents by using a technique of independent component analysis.

3. The failure cause analysis system according to claim 1, wherein:
   the first and second statistical features are expressed by a multidimensional vector; and
   the failure cause estimating unit evaluates the similarity between the statistical features by using a Euclidean distance between the multidimensional vectors.

4. The failure cause analysis system according to claim 1, comprising:
   a feature grouping unit that classifies the first statistical features output from the feature extracting unit into a plurality of groups based on similarity between the statistical features; and
   a constructing unit that determines correspondence relation between statistical features of the respective groups classified by the feature grouping unit and known failure cases by determining distributions of rates of occurrence of the known failure causes with respect to the statistical features of the respective groups, and stores the correspondence relation in the storing unit as the second statistical feature.

5. The failure cause analysis system according to claim 4, wherein
   the feature grouping unit calculates ranges of dispersion of the statistical features of the respective groups with respect to the respective groups classified, and
   the constructing unit limits the correspondence relation between the statistical features of the respective groups and the known failure causes to the ranges of dispersion calculated.

6. The failure cause analysis system according to claim 5, wherein
   the statistical features of the respective groups have a distribution conforming to a probability density function of multidimensional Gaussian distribution, and
   the feature grouping unit determines the ranges of dispersion based on the probability density function.

7. A failure cause analysis system for estimating a cause of a failure in a communication network based on recorded contents of internal processing of a communication apparatus, the system comprising:
   a feature extracting unit that extracts a statistical feature of the recorded contents at a time of occurrence of a failure from the recorded contents input;
   an output unit that outputs at least the statistical feature;
   an input unit to which evaluation information is input by a user who observes the statistical feature; and
   a failure cause estimating unit that estimates a failure cause based on the evaluation information.

8. The failure cause analysis system according to claim 7, wherein
   the output unit summarizes a plurality of at least statistical features and outputs the result of summarization.

9. A failure cause analysis method for a failure cause analysis system that estimates a cause of a failure in a communication network from recorded contents of internal processing of a communication apparatus, the method comprising:
   a feature extraction step of extracting a first statistical feature of the recorded contents at a time of occurrence of a failure from the recorded contents input; and
   a failure cause estimation step of estimating a failure cause based on similarity between a second statistical feature of the recorded contents at a time of occurrence of a past failure with a known failure cause and the first statistical feature.

10. A failure cause analysis method for a failure cause analysis system that estimates a cause of a failure in a communication network based on recorded contents of internal processing of a communication apparatus, the method comprising:
    a feature extraction step of extracting a statistical feature of the recorded contents at a time of occurrence of a failure from the recorded contents input;
    an output step of outputting at least the statistical feature;
    an input step in which evaluation information is input by a user who observes the statistical feature; and
    a failure cause estimation step of estimating a failure cause based on evaluation information.

11. A computer readable recording medium with a program for estimating a cause of a failure in a communication network from recorded contents of internal processing of a communication apparatus, the program causing a computer to execute:
    feature extraction processing of extracting a first statistical feature of the recorded contents at a time of occurrence of a failure from the recorded contents input; and
    failure cause estimation processing of estimating a failure cause based on similarity between a second statistical feature of the recorded contents at a time of occurrence of a past failure with a known failure cause and the first statistical feature.

12. A computer readable recording medium with a program for estimating a cause of a failure in a communication network based on recorded contents of internal processing of a communication apparatus, the program causing a computer to execute:
    feature extraction processing of extracting a statistical feature of the recorded contents at a time of occurrence of a failure from the recorded contents input;
    output processing of outputting at least the statistical feature;
    input processing in which evaluation information is input by a user who observes the statistical feature; and
    failure cause estimation processing of estimating a failure cause based on the evaluation information.

* * * * *